US012208403B2

(12) United States Patent
Yi

(10) Patent No.: US 12,208,403 B2
(45) Date of Patent: Jan. 28, 2025

(54) STORAGE CONTAINER AND METHOD FOR INJECTING LIQUID THEREINTO

(71) Applicant: BOTTLESS CO., LTD., Seongnam-si Gyeonggi-do (KR)

(72) Inventor: Chi Won Yi, Seongnam-si Gyeonggi-do (KR)

(73) Assignee: BOTTLESS CO., LTD., Gyeonggi-do (KR)

(*) Notice: Subject to any disclaimer, the term of this patent is extended or adjusted under 35 U.S.C. 154(b) by 19 days.

(21) Appl. No.: 18/025,178

(22) PCT Filed: Apr. 23, 2021

(86) PCT No.: PCT/KR2021/005183
§ 371 (c)(1),
(2) Date: Mar. 7, 2023

(87) PCT Pub. No.: WO2022/055064
PCT Pub. Date: Mar. 17, 2022

(65) Prior Publication Data

US 2023/0331453 A1 Oct. 19, 2023

(30) Foreign Application Priority Data

Sep. 10, 2020 (KR) ........................ 10-2020-0116408
Apr. 22, 2021 (KR) ........................ 10-2021-0052417

(51) Int. Cl.
*B05B 11/00* (2023.01)
*B65D 51/00* (2006.01)
*B65D 77/06* (2006.01)

(52) U.S. Cl.
CPC ...... *B05B 11/0038* (2018.08); *B05B 11/0054* (2013.01); *B05B 11/0097* (2013.01); *B65D 51/002* (2013.01); *B65D 77/06* (2013.01)

(58) Field of Classification Search
CPC ............. B05B 11/0097; B05B 11/0054; B05B 11/0038; B05B 11/1043; B65D 77/06
(Continued)

(56) References Cited

U.S. PATENT DOCUMENTS 6,988,496 B1 * 1/2006 Eicher ................. B05B 11/0044 128/200.14
8,720,501 B2 * 5/2014 Thilly ..................... B65B 3/003 141/59
(Continued)

FOREIGN PATENT DOCUMENTS

JP 2002-346538 A 12/2002
JP 2009-166862 A 7/2009
(Continued)

*Primary Examiner* — Timothy L Maust
(74) *Attorney, Agent, or Firm* — INVENSTONE PATENT, LLC

(57) ABSTRACT

Disclosed is a storage container, in which a valve coupled to an opening portion of a tube is not cut in advance, but the valve is cut when a liquid injection nozzle is inserted into the tube, such that a gap between the liquid injection nozzle and the valve may be perfectly blocked, thereby preventing a leak of a liquid. A storage container according to an embodiment of the present invention includes a tube made of an expandable or contractible elastic material, and a valve configured to be coupled to an upper end of the tube before a liquid is injected into the tube, in which the valve includes a ring-shaped support portion configured to be seated and supported at the upper end of the tube, and an elastic membrane extending from an end of the support portion and configured to close an opening portion of the tube.

18 Claims, 25 Drawing Sheets

(58) Field of Classification Search
USPC .......................................... 141/329; 604/411
See application file for complete search history.

(56) References Cited

U.S. PATENT DOCUMENTS

| | | | | |
|---|---|---|---|---|
| 9,597,260 | B2 * | 3/2017 | Ivosevic | A61M 39/14 |
| 9,757,750 | B2 * | 9/2017 | Holakovsky | B05B 11/026 |
| 10,016,568 | B2 * | 7/2018 | Bach | B05B 11/0054 |
| 10,688,020 | B2 * | 6/2020 | Py | A61J 1/1406 |
| 11,883,580 | B2 * | 1/2024 | Dunne | A61M 11/007 |
| 2011/0220682 | A1 | 9/2011 | Lim | |
| 2012/0325204 | A1 | 12/2012 | Holakovsky et al. | |
| 2013/0340891 | A1 * | 12/2013 | Steube | A61J 1/20<br>141/329 |

FOREIGN PATENT DOCUMENTS

| | | | |
|---|---|---|---|
| KR | 20-0400309 | Y1 | 11/2005 |
| KR | 10-2015-0115763 | A | 10/2015 |
| KR | 10-2019-0131764 | A | 11/2019 |
| KR | 10-2079144 | B1 | 2/2020 |
| KR | 10-2020-0082978 | A | 7/2020 |
| KR | 10-2020-0102215 | A | 8/2020 |
| KR | 10-2139458 | B1 | 8/2020 |
| WO | 2020-017617 | A1 | 1/2020 |
| WO | 2021-133949 | A1 | 7/2021 |

* cited by examiner

STORAGE CONTAINER AND METHOD FOR INJECTING LIQUID THEREINTO

CROSS-REFERENCE TO RELATED APPLICATIONS

This application is a National Stage filing under 35 U.S.C. 371 of International Application No. PCT/KR2021/005183, filed on Apr. 23, 2021, which claims the benefit of earlier filing date and right of priority to Korean Application No. 10-2020-0116408, filed on Sep. 10, 2020 and Korean Application No. 10-2021-0052417, filed on Apr. 22, 2021 in the Korean Intellectual Property Office, the contents of which are all hereby incorporated by reference herein in their entirety.

BACKGROUND OF THE DISCLOSURE

Technical Field

The present invention relates to a storage container and a method of injecting a liquid thereinto.

Background Art

In general, a liquid storage container, which stores a liquid such as lotion, shampoo, detergent, and cosmetic, includes a main container body configured to store a liquid therein, and a discharge means coupled to the main container body and configured to discharge the liquid, which is stored in the main container body, to the outside by pumping the liquid.

In case that a predetermined or more amount of liquid stored in the main container body of the liquid storage container is consumed, the overall amount of liquid remaining in the main container body cannot be used. Therefore, a user discards the liquid storage container with the liquid remaining in the liquid storage container. Alternatively, to use the liquid remaining in the main container body, the user separates the discharge means from the main container body, turns the main container body upside down, and then discharges the liquid, which remains in the main container body, to the outside by applying impact to the main container body.

However, the discarded liquid storage container with the liquid remaining therein causes environmental pollution, and it is convenient to use the remaining liquid.

Therefore, in the related art, a balloon-shaped liquid storage container made of an extendable/contractible material has been developed to solve the above-mentioned problems.

The extendable/contractible balloon-shaped liquid storage container is configured to apply an elastic force and consistently compress an internal space, which stores a liquid, while being contracted in accordance with the amount of consumption of the liquid, such that the overall amount of the liquid stored in the container may be used.

The liquid storage container in the related art includes: an outer casing; a tube accommodated in the outer casing, made of an elastic material, and configured to store a liquid therein; a valve coupled to an upper end of the tube to close an inlet of the tube; and a pump configured to communicate with an interior of the tube while penetrating the valve and perform a pumping operation to discharge the liquid, which is stored in the tube, to the outside.

Meanwhile, the tube made of an elastic material is characterized by being autonomously contracted by means of an elastic force thereof when the liquid stored in the tube is expanded.

Therefore, in the related art, to prevent the liquid stored in the tube from being discharged to the outside by the contraction of the tube at the time of injecting the liquid into the tube, the liquid is injected into the tube in a state in which the tube is expanded by negative pressure, the valve is coupled to the upper end of the tube, and then the negative pressure is removed.

However, in this case, a facility for applying negative pressure to the tube and removing the negative pressure from the tube is additionally required, and an overall process time is increased, which causes a problem in that productivity deteriorates, and costs are increased.

In addition, in the related art, to solve the above-mentioned problems, a method is used in which a valve having a cut-out groove is coupled, in advance, to an upper end of the tube, a nozzle configured to supply a liquid is inserted into the cut-out groove, and then the liquid is injected into the tube.

However, in this case, there are problems in that during a process in which the nozzle is inserted into the tube while penetrating the valve through the cut-out groove or during a process in which the nozzle is separated from the valve after the liquid is injected, the valve cannot be completely in close contact with the tube, a part of the cut-out groove is opened, and the liquid leaks through the opened part of the cut-out groove. In addition, there is a problem in that a post-process needs to be performed to remove the liquid having leaked from the upper end of the valve after the nozzle is coupled to or separated from the valve.

SUMMARY OF THE DISCLOSURE

The present invention has been made in an effort to solve the above-mentioned problems, and an object of the present invention is to provide a storage container, in which a valve coupled to an opening portion of a tube is not cut in advance, but the valve is cut when a liquid injection nozzle is inserted into the tube, such that the valve may be perfectly in close contact with an outer surface of the liquid injection nozzle, and a gap between the liquid injection nozzle and the valve is perfectly blocked, which makes it possible to prevent a leak of a liquid, and a method of injecting a liquid thereinto.

Another object of the present invention is to provide a storage container and a method of injecting a liquid thereinto, which are capable of simplifying a process, improving productivity, and reducing costs.

Technical problems of the present invention are not limited to the aforementioned technical problems, and other technical problems, which are not mentioned above, may be clearly understood by those skilled in the art from the following descriptions.

To achieve the above-mentioned objects, a storage container according to an embodiment of the present invention includes a tube made of an expandable or contractible elastic material, and a valve configured to be coupled to an upper end of the tube before a liquid is injected into the tube, in which the valve includes a ring-shaped support portion configured to be seated and supported at the upper end of the tube, and an elastic membrane extending from an end of the support portion and configured to close an opening portion of the tube.

The storage container may further include: a support ring configured to accommodate the tube and the valve, in which the support ring includes: a ring body configured to accommodate the tube therein and protect the tube from the outside; and a catching projection configured to support the upper end of the tube accommodated in the ring body.

The tube may include: a tube body accommodated in the ring body and configured to accommodate the liquid therein; a first catching portion extending from an end of the tube body in a radial direction of the tube body and seated and supported on the catching projection; and a second catching portion extending upward from an end of the first catching portion and supported on the ring body.

The support portion may include: a first support projection supported on the first catching portion and the second catching portion; and a second support projection supported on the second catching portion and the ring body.

The valve may further include a gap blocking member disposed on a bottom surface of the first support projection corresponding to the first catching portion, and the gap blocking member may be configured to block a gap between the first catching portion and the first support projection by being compressed between the first catching portion and the first support projection when pressure is applied to the valve in a vertical direction.

The elastic membrane may have a structure protruding from the end of the support portion in an axial direction of the valve to a lower side of the valve.

The elastic membrane may have a structure in which an inner diameter gradually decreases in a direction in which the elastic membrane protrudes.

The elastic membrane may be formed in a hemispherical shape.

The elastic membrane has a structure in which a thickness gradually increases in the direction in which the elastic membrane protrudes.

The storage container may further include: a liquid injection nozzle configured to be inserted into the tube while cutting the elastic membrane and inject the liquid into the tube.

The liquid injection nozzle may include: a discharge part having a tubular shape and configured to discharge the liquid, which flows in the discharge part, in different directions; and a blade part extending from the discharge part and having a wedge structure in which a width of a cross-section gradually decreases toward an end thereof, the blade part being configured to press and cut the elastic membrane while being moved by the discharge part.

The blade part may include: a pair of first bevel surfaces disposed to be opposite to each other in a first direction and each having a concave curved shape; and a second bevel surface disposed to be inclined in a second direction that intersects the first direction.

The pair of first bevel surfaces may have different radii of curvature. The discharge part may include: a discharge body having a tubular shape so that the liquid flows in the discharge body; a first discharge hole configured to discharge the liquid, which flows in the discharge body, in the first direction; and a second discharge hole configured to discharge the liquid, which flows in the discharge body, in the second direction.

The storage container may further include: a casing configured to accommodate therein an assembly, which is made by coupling the tube, the valve, and the support ring, to protect the assembly from the outside or configured to be coupled to the assembly to accommodate at least a part of the assembly and expose another part of the assembly to the outside, in which the casing is configured to be coupled to or separated from the support ring.

When the casing and the support ring are coupled, the tube may be disposed inside the casing, and a part of the support ring may be disposed outside the casing.

The support ring may further include a coupling plate disposed on an outer surface of the ring body and configured to be coupled to or separated from the casing.

The coupling plate may include: a first coupling plate disposed outside the casing and supported on an outer surface of the casing when the first coupling plate is coupled to the casing; and a second coupling plate disposed to be spaced apart from the first coupling plate in an axial direction of the ring body, the second coupling plate being disposed inside the casing and supported on an inner surface of the casing when the second coupling plate is coupled to the casing.

The casing may include: a main body opened at one side thereof and configured to accommodate the assembly; and a cover configured to open or close one opened side of the main body by being coupled to the main body or separated from the main body, and the main body and the cover may include coupling parts configured to be coupled to the support ring by a process of coupling the main body and the cover or separated from the support ring by a process of separating the main body and the cover.

When the coupling part is coupled to the support ring, the coupling part may support the ring body and the coupling plate, restrict a free movement of the support ring in a center axis direction of the support ring and a radial direction of the support ring, and dispose a part of the support ring outside the casing.

The coupling parts may include: a first coupling part provided on the main body and configured to support a part of the ring body and the first coupling plate and the second coupling plate; and a second coupling part provided on the cover and configured to support another part of the ring body and the first coupling plate.

The first coupling part may include: a first main support member configured to support the second coupling plate in the center axis direction of the support ring; a first accommodation groove formed in the first main support member and configured to support a part of the ring body in the radial direction of the support ring; and an auxiliary support member protruding from the first main support member and configured to support a part of the first coupling plate in the center axis direction of the support ring, the auxiliary support member being configured to allow the first coupling plate to be spaced apart from an outer surface of the first main support member to define a coupling groove between the outer surface of the first main support member and the first coupling plate so that the second coupling part is accommodated in the coupling groove.

The second coupling part may include: a second main support member accommodated in the coupling groove by being guided by the auxiliary support member and configured to support another part of the first coupling plate in the center axis direction of the support ring; and a second accommodation groove formed in the second main support member and configured to support another part of the ring body in the radial direction of the support ring.

The casing may further include a support mold disposed in the main body and having a seating groove corresponding to an external shape of the assembly to support the assembly.

The casing may have a polyhedral structure opened at an upper side thereof so that the tube enters or exits the casing in a center axis direction of the ring body, and the coupling plate may be configured to be coupled to or separated from an upper end of the casing in the center axis direction of the ring body.

The casing may include at least one coupling member formed at the upper end thereof, the coupling plate may include at least one long groove capable of being coupled to the at least one coupling member, the coupling plate may be caught and supported by the upper end of the casing when the long groove is coupled to the coupling member, and the coupling plate may be accommodated in the casing and supported on an inner surface of the casing when the long groove is separated from the coupling member.

The storage container may further include: a protection cap coupled to the ring body and configured to protect the valve, which is accommodated in the ring body, from the outside.

The storage container may further include: a dispenser coupled to the protection cap, supported at an upper end of the valve, and configured to discharge the liquid stored in the tube.

The casing may include: an accommodation body having therein a predetermined space capable of accommodating the assembly and having an upper side configured to be opened or closed; and a support configured to enter or exit an interior of the accommodation body through the opened upper side of the accommodation body and coupled to the assembly to support the assembly.

The support may include: a base member having the space therein and having a length corresponding to the accommodation body; and a plurality of coupling support members disposed on the base member and configured to be coupled to the assembly at different positions so that the entire assembly is disposed inside the base member, or at least a part of the assembly is disposed inside the base member and another part of the assembly is disposed outside the base member.

The plurality of coupling support members may include: a first coupling support member disposed in the base member and configured to divide an internal space of the base member, the first coupling support member being coupled to the support ring so that the assembly is disposed in the base member; and a second coupling support member disposed at an upper end of the base member and configured to be coupled to the support ring so that the tube is disposed inside the base member, and the dispenser is disposed outside the base member.

The first coupling support member and the second coupling support member may include ring accommodation grooves configured to accommodate the support ring therein and each having a shape corresponding to an outer surface of the support ring.

The support may include: a first accommodation space provided between the first coupling support member and the second coupling support member and configured to accommodate the tube; and a second accommodation space provided below the first coupling support member and configured to accommodate the dispenser when the support ring is coupled to the first coupling support member.

To achieve the above-mentioned objects, a method of injecting a liquid into the storage container according to an embodiment of the present invention includes: closing the opening portion of the tube by coupling the valve to the tube coupled to the support ring; cutting the valve by inserting the liquid injection nozzle into the storage container; expanding the tube by injecting the liquid into the tube; and separating the liquid injection nozzle from the storage container. The closing of the opening portion of the tube may include: inserting the tube body into the ring body and seating the first catching portion on the catching projection; disposing the elastic membrane in the opening portion of the tube by seating the second support projection on the second catching portion; and closing the opening portion of the tube by pressing the valve in a vertical direction, bringing the first support projection into close contact with the first catching portion, and compressing the elastic membrane against an inner surface of the tube body.

The cutting of the valve may include: aligning the liquid injection nozzle, which is disposed above the valve, and the valve at a coaxial position; cutting the elastic membrane and gradually expanding a cut portion by moving the liquid injection nozzle downward; and disposing the first discharge hole and the second discharge hole in the tube.

According to the embodiment of the present invention, the valve coupled to the opening portion of the tube is not cut in advance, but the valve is cut when the liquid injection nozzle is inserted into the tube, such that the valve may be perfectly in close contact with the outer surface of the liquid injection nozzle, and thus a gap between the liquid injection nozzle and the valve is perfectly blocked, which makes it possible to prevent a leak of the liquid.

In addition, a valve cutting process of forming in advance a cut-out groove in the valve may be excluded, such that the entire process may be simplified, and the productivity and costs of the product may be reduced.

The effects according to the present invention are not limited to the above-mentioned effects, and more various effects are included in the present invention.

DETAILED DESCRIPTION OF THE DISCLOSURE

Figure 1:
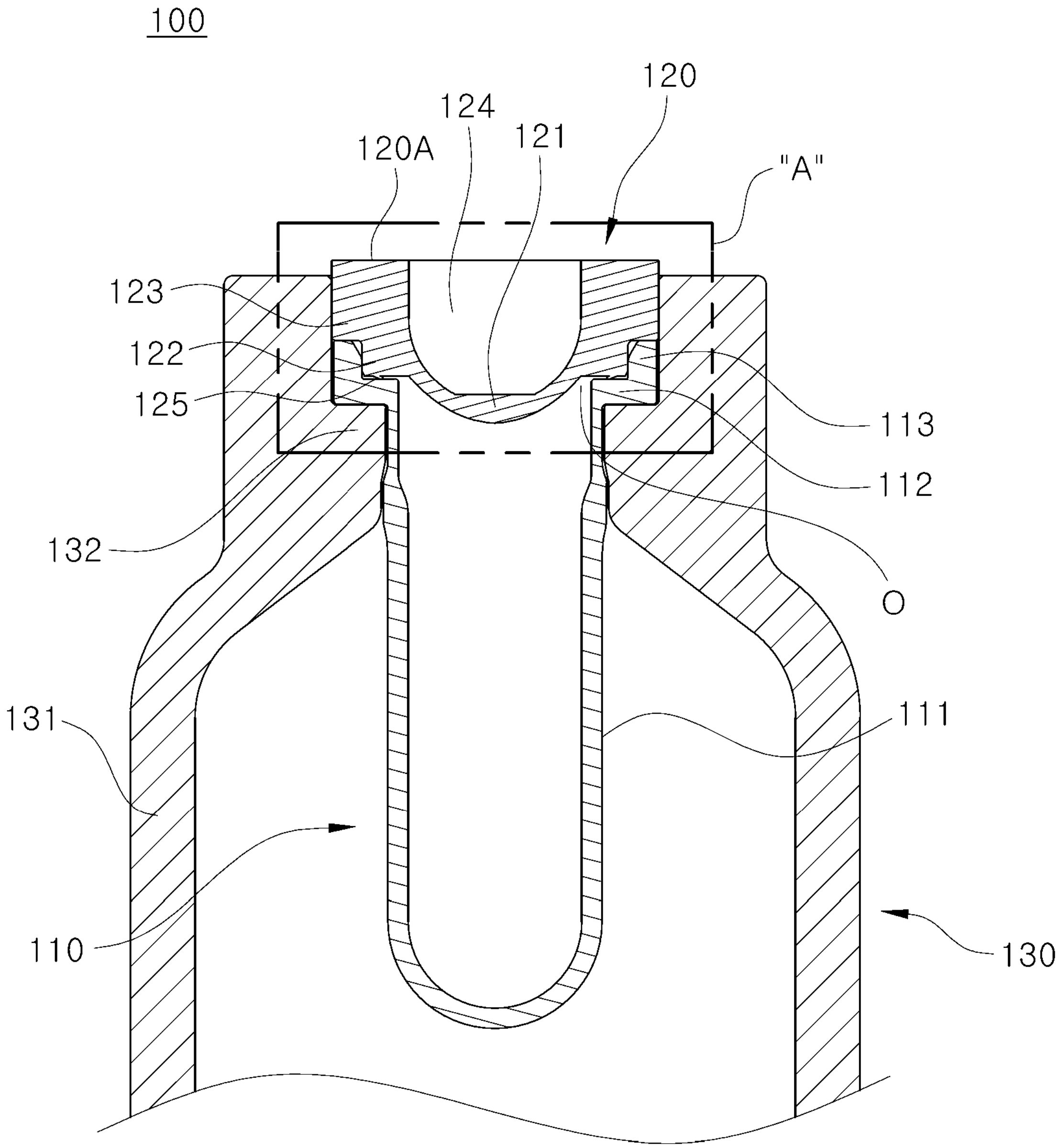
FIG. 1 is a cross-sectional view illustrating a storage container according to an embodiment of the present invention.

Hereinafter, various exemplary embodiments will be described in more detail with reference to the accompanying drawings. The exemplary embodiments disclosed in the present specification may be variously modified. Specific embodiments will be illustrated in the drawings and described in detail in the detailed description. However, the specific embodiments illustrated in the accompanying drawings are merely intended to facilitate understanding of various embodiments. Therefore, the technical spirit is not limited by the specific embodiments illustrated in the accompanying drawings, and the scope of the present invention should be understood as including all equivalents or substitutes included in the spirit and technical scope of the present invention.

The terms including ordinal numbers such as ‘first,’ ‘second,’ and the like may be used to describe various constituent elements, but the constituent elements are not limited by the terms. These terms are used only to distinguish one constituent element from another constituent element.

In the present specification, it should be understood the terms “comprises,” “comprising,” “includes,” “including,” “containing,” “has,” “having” or other variations thereof are inclusive and therefore specify the presence of stated features, integers, steps, operations, elements, components, or combinations thereof, but do not preclude the presence or addition of one or more other features, integers, steps, operations, elements, components, or combinations thereof. When one constituent element is described as being “coupled” or “connected” to another constituent element, it should be understood that one constituent element can be coupled or connected directly to another constituent element, and an intervening constituent element can also be present between the constituent elements. When one constituent element is described as being “coupled directly to” or “connected directly to” another constituent element, it should be understood that no intervening constituent element is present between the constituent elements.

Meanwhile, the term “module” or “unit” used for a constituent element used in the present specification performs at least one function or operation. Further, the “module” or “unit” may perform the function or operation by hardware, software, or a combination of hardware and software. In addition, except for the “module” or “unit” that should be performed in specific hardware or performed by at least one processor, a plurality of “modules” or a plurality of “units” may be integrated into at least one module. Singular expressions include plural expressions unless clearly described as different meanings in the context.

In addition, in the description of the present invention, the specific descriptions of related well-known functions or configurations will be summarized or omitted when it is determined that the specific descriptions may unnecessarily obscure the subject matter of the present invention.

FIG. 1 is a cross-sectional view illustrating a storage container according to an embodiment of the present invention.

Referring to FIG. 1, a storage container 100 according to an embodiment of the present invention (hereinafter, referred to as the ‘the storage container 100’) includes a tube 110, a valve 120, and a support ring 130.

The tube 110 is made of an elastic material so that the tube 110 is expanded when a liquid is stored therein, and the tube 110 is contracted when the liquid stored in the tube 110 is discharged to the outside. Therefore, in case that the liquid is consumed in a state in which the liquid is stored and the tube 110 is expanded, the tube 110 is contracted by an elastic force, which may compensate for a space corresponding to the amount of consumption of the liquid. Therefore, when an opening portion O of the tube 110 is opened, an overall amount of the liquid stored in the tube 110 may be discharged to the outside of the tube 110 by the elastic force of the tube 110 without remaining in the tube 110. For example, the tube 110 may be made of any one of silicone, rubber, and latex or made of a combination thereof. For reference, in the present embodiment, examples of the liquid may include all liquids having viscosity or having no viscosity, and semi-liquid materials such as a gel.

Figure 2:
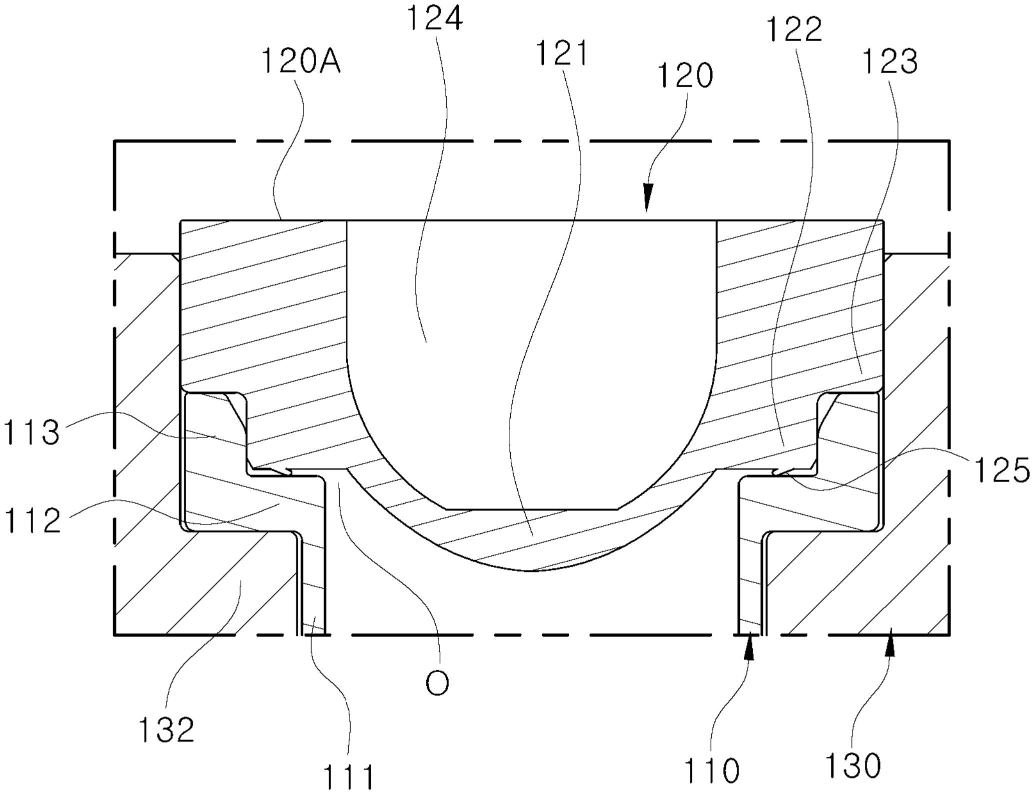
FIG. 2 is an enlarged view of part "A" in FIG. 1.

FIG. 2 is an enlarged view of part “A” in FIG. 1.

Referring to FIGS. 1 and 2, the tube 110 may include a tube body 111 accommodated in the support ring 130, and catching portions 112 and 113 supported and caught by the support ring 130.

The tube body 111 may be accommodated in a ring body 131 including: a neck portion capable of being coupled to a dispenser (not illustrated) configured to discharge the liquid accommodated in the tube 110 by performing a pumping operation; and a container portion extending downward from the neck portion and having an accommodation space therein.

The tube body 111 may be made of an elastic material that is expandable and contractible. The tube body 111 may accommodate the liquid therein. For example, the tube body 111 may include: a first body portion extending from the catching portions 112 and 113 and supported on the neck portion of the ring body 131; and a second body portion extending from the first body portion and accommodated in the container portion of the ring body 131, the second body portion having a relatively larger thickness than the first body portion. Because the second body portion has a larger thickness than the first body portion, durability may be improved, and a burst caused by internal pressure may be prevented when the tube body is expanded. The deterioration in elastic force may be prevented even though the tube body is expanded over a long period of time.

The catching portions 112 and 113 may extend in a radial direction of the tube body 111 from an upper end of the tube body 111 and be caught and supported by the neck portion of the ring body 131.

The catching portions may include: a first catching portion 112 extending in the radial direction of the tube body 111 from the upper end of the tube body 111 and supported on a catching projection 132 provided on the ring body 131; and a second catching portion 113 extending upward from an end of the first catching portion 112 and supported on an inner peripheral surface of the ring body 131.

Therefore, even though a magnitude of a load applied to the catching portions in a vertical direction is increased as the liquid is stored in the tube body 111, the catching portions may be stably mounted on the catching projection 132 of the ring body 131, without being deformed or folded into the ring body 131 accommodated in the tube body 111, by means of the first catching portion 112 extending in a horizontal direction from the tube body 111 and the second catching portion 113 extending in the vertical direction from the first catching portion 112.

Meanwhile, although not illustrated in the drawings, a reinforcing material (not illustrated) made of metal may be further disposed in the first catching portion 112 to improve rigidity of the first catching portion 112. Therefore, even though a load applied to the tube body 111 increases, it is possible to maintain the state in which the first catching portion 112 is stably supported on the catching projection 132 of the ring body 131.

Referring to FIGS. 1 and 2, the valve 120 is made of an elastic material. The valve 120 is coupled to an upper end of the tube 110 before the liquid is injected into the tube 110. For example, the valve 120 may be made of an elastic material having a value of about 50 hardness. In this case, the hardness value of the elastic material may mean a hardness value measured by a Shore hardness gauge. However, the material of the valve 120 is not necessarily limited thereto but may be changed to various materials.

The valve 120 includes a support portion 120A and an elastic membrane 121.

The support portion 120A has a ring shape and is seated and supported on the upper end of the tube 110.

Specifically, the support portion 120A may include: a first support projection 122 supported on the first catching portion 112 and the second catching portion 113; a second support projection 123 supported on the second catching portion 113 and the ring body 131; and a nozzle accommodation groove 124 capable of accommodating a liquid injection nozzle 200.

That is, the valve 120 has the plurality of support projections 122 and 123 formed to define a multistage structure, such that the valve 120 may be primarily supported by the first catching portion 112 and the second catching portion 113 and secondarily supported by the second catching portion 113 and the ring body 131.

Therefore, the valve 120 may be disposed in a state in which the valve 120 is stably fixed to the upper end of the tube 110.

The elastic membrane 121 extends from an end of the support portion 120A and is configured to block the opening portion O of the tube 110.

Specifically, the elastic membrane 121 may have a structure protruding from the end of the first support projection 122 toward a lower side of the valve 120 in an axial direction of the valve 120. The elastic membrane 121 may have an outer diameter corresponding to an inner diameter of the tube body 111.

Therefore, when the first support projection 122 is brought into close contact with the first catching portion 112 as the valve 120 is pressed in the vertical direction in a state in which the elastic membrane 121 is disposed in the opening portion O of the tube 110, the elastic membrane 121 closes the opening portion O of the tube 110 while being compressed against an inner surface of the tube body 111.

In addition, the elastic membrane 121 may have a structure in which an inner diameter of the elastic membrane 121 gradually decreases in a direction in which the elastic membrane 121 protrudes. Specifically, the elastic membrane 121 may have a hemispherical shape.

Therefore, the pressure of the liquid applied to a surface of the elastic membrane 121 is uniformly dispersed along the protruding surface of the elastic membrane 121 without being concentrated at any one portion. Therefore, even though the elastic membrane 121 is cut by the liquid injection nozzle 200, the pressure of the liquid is uniformly distributed to a periphery of the elastic membrane 121 without being concentrated at the cut portions. Therefore, the cut portions may perfectly come into close contact with each other.

The valve 120 may further include a gap blocking member 125.

The gap blocking member 125 may be disposed on a bottom surface of the first support projection 122 corresponding to the first catching portion 112. When the pressure is applied to the valve 120 in the vertical direction, the gap blocking member 125 may come into close contact with the first catching portion 112 and the first support projection 122 and block a gap between the first catching portion 112 and the first support projection 122.

Therefore, it is possible to perfectly seal a portion between the first catching portion 112 and the first support projection 122, close the opening portion O of the tube 110, and prevent the liquid from leaking between the first catching portion 112 and the first support projection 122.

The support ring 130 may be configured to accommodate the tube 110 and the valve 120.

Specifically, the support ring 130 may include: the ring body 131 configured to accommodate the tube 110 therein and protect the tube 110 from the outside; and the catching projection 132 configured to support the upper end of the tube 110.

For example, the ring body 131 may have a container shape capable of accommodating the entire tube 110. Alternatively, the ring body 131 may have a ring shape configured to only an upper portion of the tube 110 and coupled to a separate packaging container (not illustrated) or a casing (not illustrated) capable of protecting a lower portion of the tube 110 from the outside.

Figure 3:
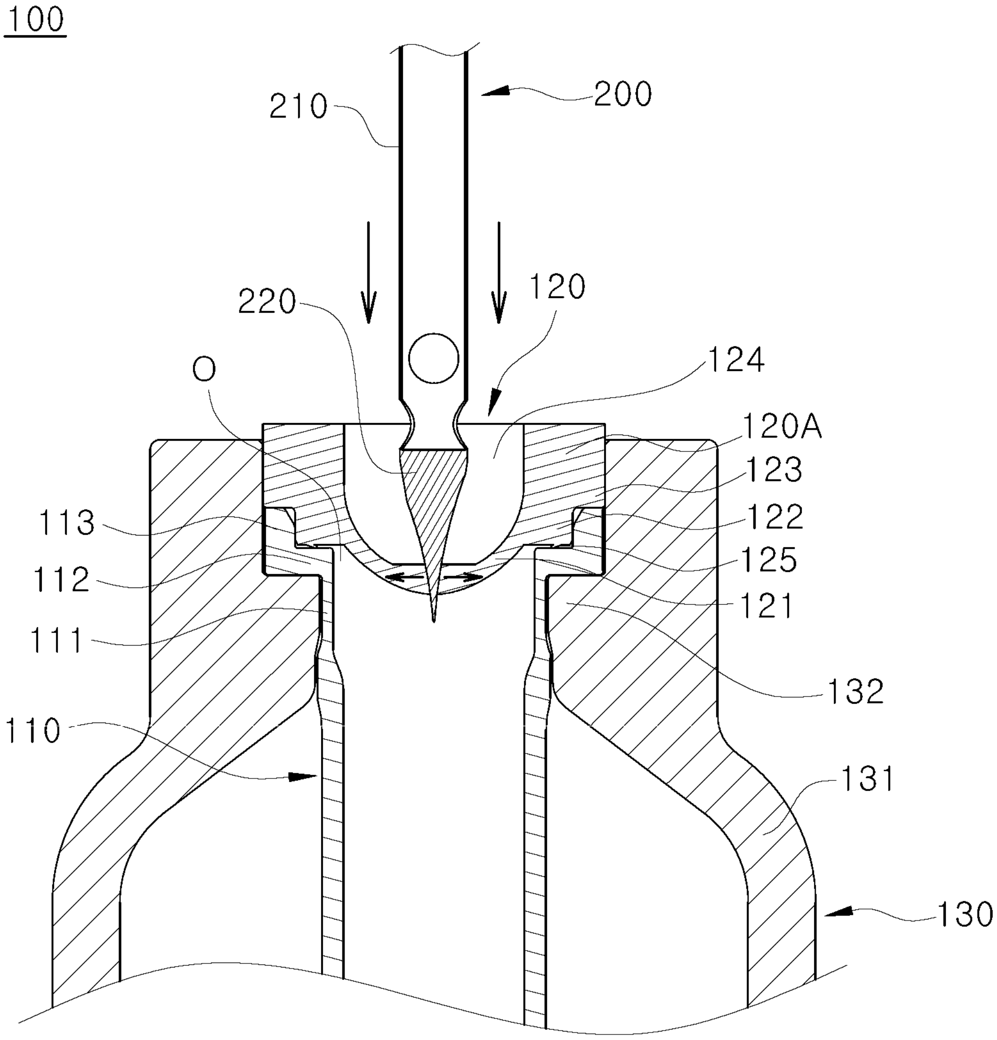
FIG. 3 is a view schematically illustrating a state in which a liquid is injected into a tube of the storage container according to the embodiment of the present invention.

FIG. 3 is a view schematically illustrating a state in which a liquid is injected into the tube of the storage container according to the embodiment of the present invention.

Referring to FIG. 3, the storage container 100 may further include the liquid injection nozzle 200.

The liquid injection nozzle 200 may be configured to move downward toward the inside of the tube 110 from a location above the valve 120 and be inserted into the tube 110 to inject the liquid into the tube 110 while cutting the elastic membrane 121.

In this case, the elastic membrane 121 may be kept in close contact with an outer surface of the liquid injection nozzle 200 by being elastically deformed while corresponding to the outer surface of the liquid injection nozzle 200 that penetrates the elastic membrane 121. Therefore, it is possible to prevent a leak of the liquid by sealing the interior of the tube 110 that stores the liquid.

Meanwhile, referring to FIGS. 2 and 3, in consideration of vulnerability of a portion cut by the liquid injection nozzle 200, the elastic membrane 121 may have a structure in which a thickness of the elastic membrane 121 gradually increases in the direction in which the elastic membrane 121 protrudes. Therefore, a central portion of the elastic membrane 121, which is to be cut by the liquid injection nozzle 200, may have the largest thickness.

That is, in case that the liquid injection nozzle 200, which has cut the elastic membrane 121, is separated from the elastic membrane 121, the elastic membrane 121 closes the cut portion while being elastically restored by the elastic force. In this case, in case that the portion, which is to be cut by the liquid injection nozzle 200, is formed to be thicker than the other portions, a section, which is to be elastically restored, increases. Therefore, in case that the liquid injection nozzle 200 is separated from the elastic membrane 121, the elastic membrane 121 closes the cut portion while being elastically restored before the liquid is introduced into a cut gap of the elastic membrane 121 and leaks to the outside, which makes it possible to perfectly prevent a leak of the liquid.

Figure 4:
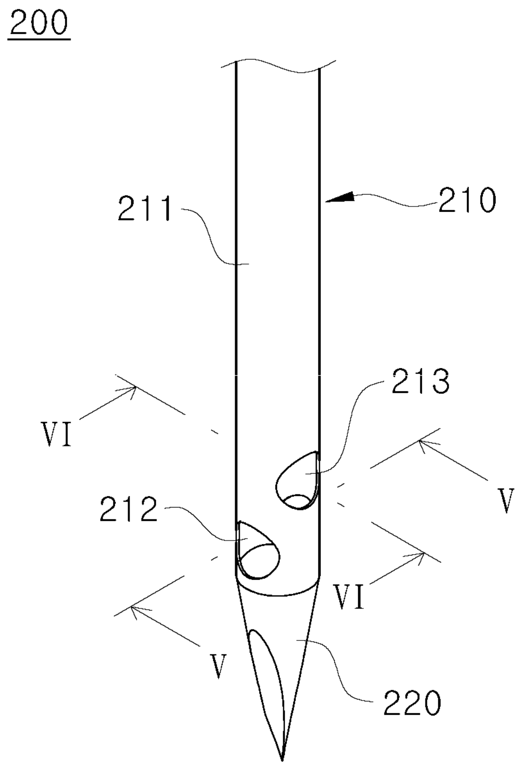
FIG. 4 is a perspective view illustrating a liquid injection nozzle of the storage container according to the embodiment of the present invention.
Figure 5:
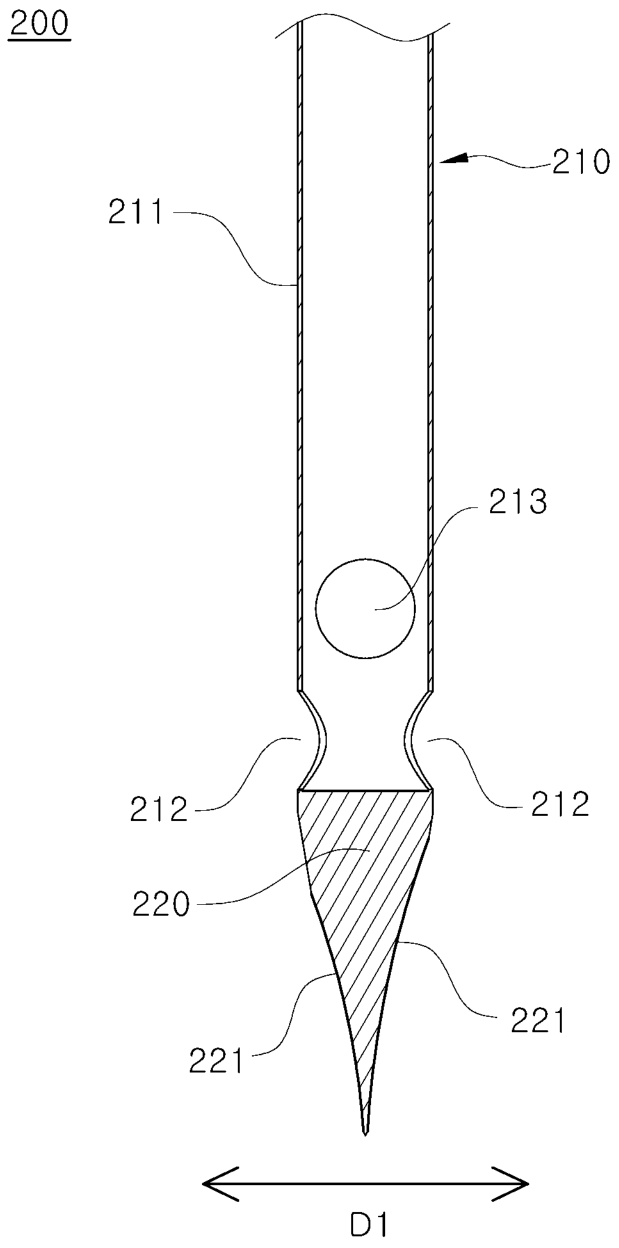
FIG. 5 is a cross-sectional view taken along line V-V in FIG. 4.
Figure 6:
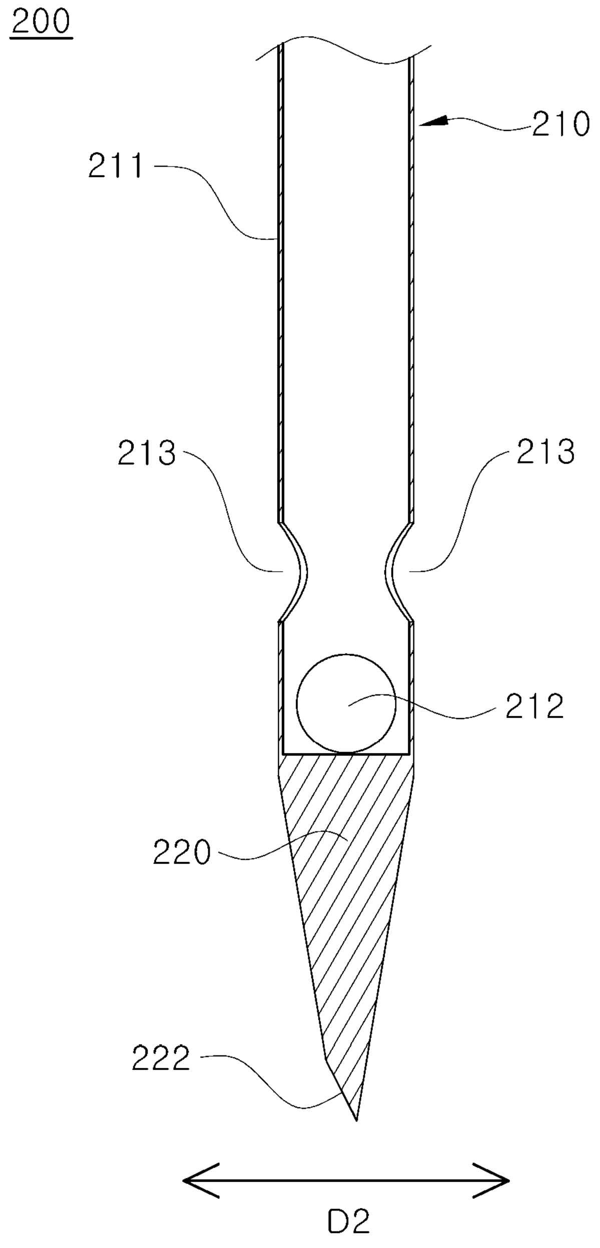
FIG. 6 is a cross-sectional view taken along line VI-VI in FIG. 4.

FIG. 4 is a perspective view illustrating the liquid injection nozzle of the storage container according to the embodiment of the present invention, FIG. 5 is a cross-sectional view taken along line V-V in FIG. 4, and FIG. 6 is a cross-sectional view taken along line VI-VI in FIG. 4.

Referring to FIGS. 3 and 4, the liquid injection nozzle 200 may include a discharge part 210 and a blade part 220.

The blade part 220 has a wedge structure in which the blade part 220 extends from the discharge part 210, and a width of a cross-section thereof gradually decreases toward an end of the blade part 220. The blade part 220 may be configured to press and cut the valve 120 while being moved by the discharge part 210.

The blade part 220 may have a plurality of cut surfaces having different shapes.

Specifically, referring to FIGS. 5 and 6, the blade part 220 may include: a pair of first bevel surfaces 221 each having a concave curved shape and disposed to be opposite to each other in a first direction D1; and a second bevel surface 222 disposed to be inclined in a second direction D2 that intersects the first direction D1. In this case, the pair of first bevel surfaces 221 may have different radii of curvature.

That is, the blade part 220 has a wedge structure including at least three cut surfaces having different shapes, which makes it possible to quickly cut the elastic membrane 121 while minimizing damage to the elastic membrane 121 and more easily bring the blade part 220 into close contact with the elastic membrane 121. However, the shape of the blade part 220 is not necessarily limited thereto but may be changed to various structures and shapes.

Referring to FIG. 4, the discharge part 210 may be formed in a tubular shape and configured such that the liquid flowing in the discharge part 210 is discharged in different directions.

Referring to FIGS. 5 and 6, the discharge part 210 may include: a discharge body 211 formed in a tubular shape so that the liquid flows in the discharge body 211; a first discharge hole 212 configured to discharge the liquid, which flows in the discharge body 211, in the first direction D1; and a second discharge hole 213 configured to discharge the liquid, which flows in the discharge body 211, in the second direction D2.

That is, because the discharge part 210 is configured to supply the liquid from a plurality of positions, the liquid may be more quickly injected, and the liquid may be entirely uniformly injected without being concentrated at any one portion in the tube 110.

Figure 7:
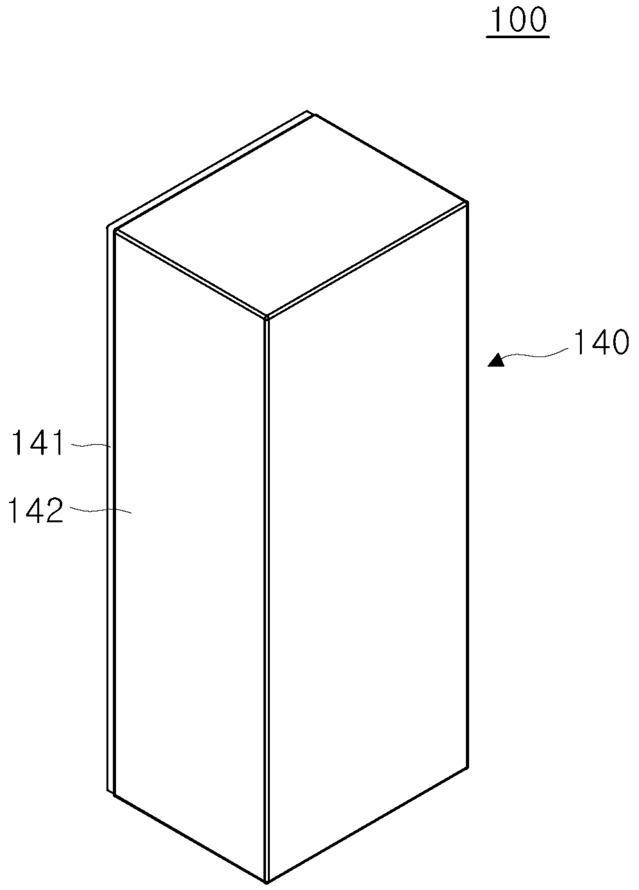
FIG. 7 is a perspective view illustrating a state in which an assembly is accommodated in a casing of the storage container according to the embodiment of the present invention.
Figure 8:
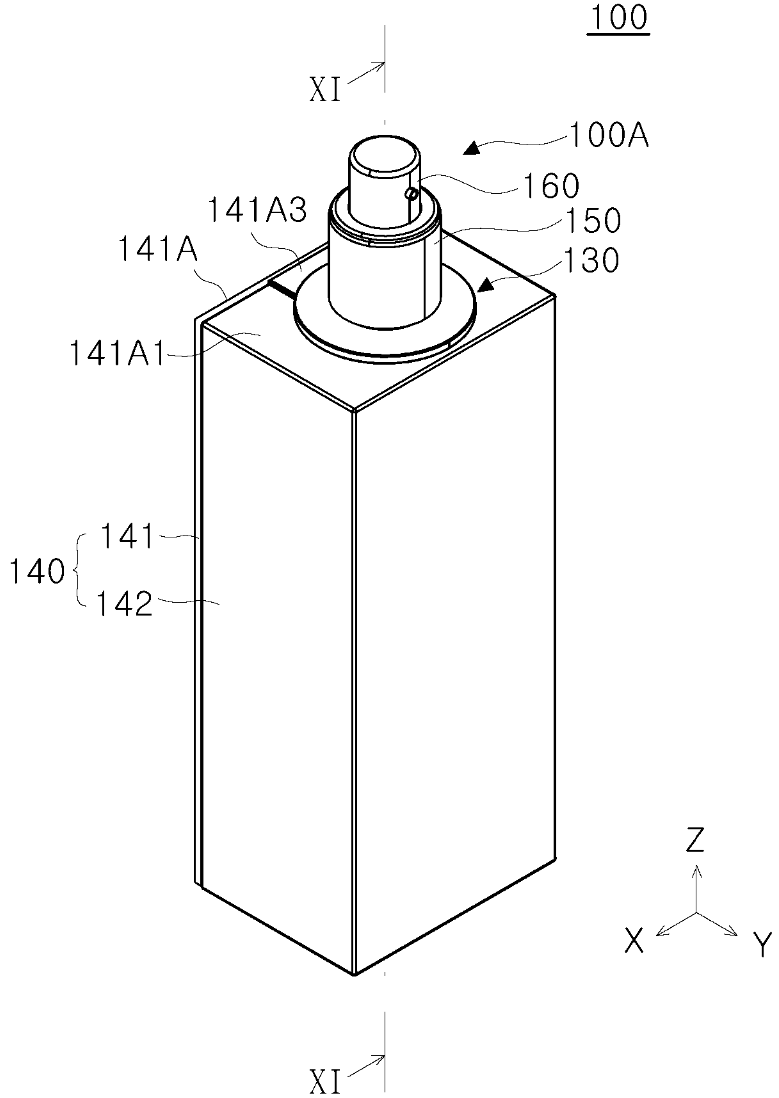
FIG. 8 is a perspective view illustrating a state in which a support ring is coupled to the casing of the storage container according to the embodiment of the present invention.

FIG. 7 is a perspective view illustrating a state in which an assembly is accommodated in a casing of the storage container according to the embodiment of the present invention, and FIG. 8 is a perspective view illustrating a state in which the support ring is coupled to the casing of the storage container according to the embodiment of the present invention.

Referring to FIG. 8, the storage container 100 may further include a casing 140, a protection cap 150, and a dispenser 160.

The protection cap 150 may be coupled to the ring body 131 and protect the valve 120, which is accommodated in the ring body 131, from the outside. The protection cap 150 may stably fix the dispenser 160 by pressing a part of the dispenser 160, which is supported at an upper end of the valve 120, toward the valve 120.

For example, the protection cap 150 may be formed in a tubular shape corresponding to an outer peripheral surface of the ring body 131 and screw-coupled to the outer peripheral surface of the ring body 131.

The dispenser 160 may be coupled to the protection cap 150 and supported at the upper end of the valve 120, and the dispenser 160 may discharge the liquid, which is stored in the tube 110, to the outside by performing a pumping operation.

For example, the dispenser 160 may include: a pumping part configured to discharge the liquid, which is stored in the tube 110, to the outside by generating a pressure difference by moving upward or downward; and a supply tube disposed in the tube 110 while communicating with the pumping part and configured to supply the liquid, which is stored in the tube 110, to the pumping part when the pressure difference is generated by the pumping part. However, the dispenser 160 is not necessarily limited thereto but may be changed to various structures and shapes that may discharge the liquid, which is stored in the tube 110, to the outside.

Referring to FIGS. 7 and 8, the casing 140 may accommodate and store therein an assembly 100A made by coupling the tube 110, the valve 120, the support ring 130, the protection cap 150, and the dispenser 160, and the assembly 100A may be disposed in a state of standing upright with respect to the ground surface. In this case, the ground surface may mean a surface on which the storage container 100 is supported.

The casing 140 may be provided in the form of a box that accommodates the assembly 100A therein and protects the assembly 100A from the outside. For example, the casing 140 may have a polyhedral structure including a plurality of surfaces. However, the shape of the casing 140 is not necessarily limited thereto but may be changed to various shapes.

The casing 140 may be coupled to an assembly 110A and configured to accommodate at least a part of the assembly 110A therein while exposing another part of the assembly 110A to the outside.

Referring to FIG. 8, the casing 140 may be configured to be coupled to or separated from the support ring 130 of the assembly 100A.

When the casing 140 and the support ring 130 are coupled, the tube 110 is disposed inside the casing 140, and a part of the support ring 130 may be disposed outside the casing 140.

On the contrary, when the casing 140 and the support ring 130 are not coupled, both the tube 110 and the support ring 130 may be disposed inside the casing 140.

That is, the casing 140 may not only be used as a storage box capable of accommodating the assembly 100A but also be used as a housing or stand capable of mounting the assembly 100A by supporting the assembly 100A in the state in which a part of the assembly 100A is exposed to the outside.

Therefore, the storage container 100 according to the embodiment of the present invention may minimize the occurrence of waste and reduce manufacturing costs. In addition, because the shape of the casing 140 may be changed to various shapes, it is possible to improve utilization and aesthetic appearance.

In addition, the casing 140 may be coupled to the support ring 130 and define a rigid sheath formed outside the soft tube 110, such that a user may stably grip the casing 140 and stand the assembly 100A on a bottom surface.

Figure 9:
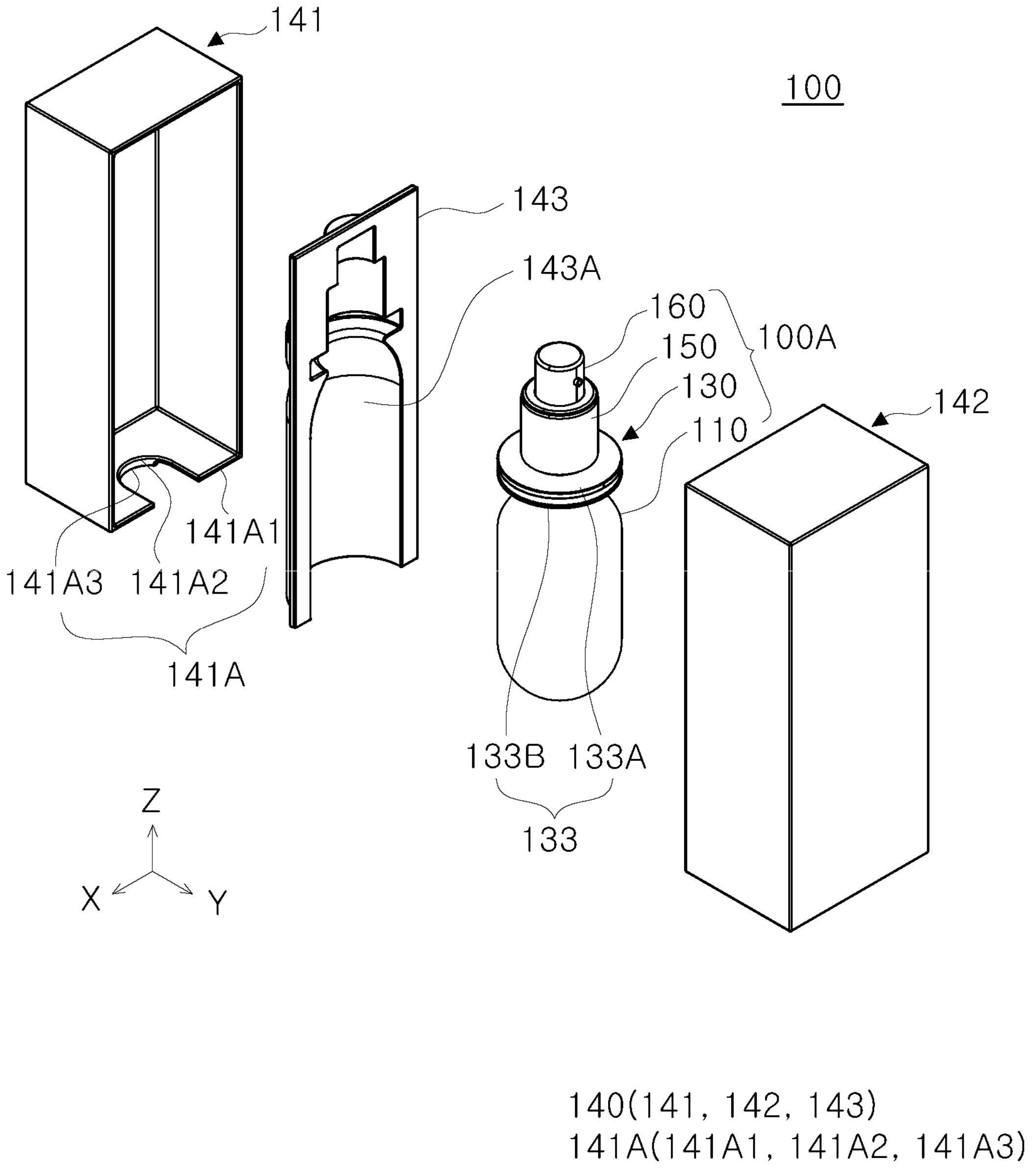
FIG. 9 is an exploded perspective view of FIG. 7.
Figure 10:
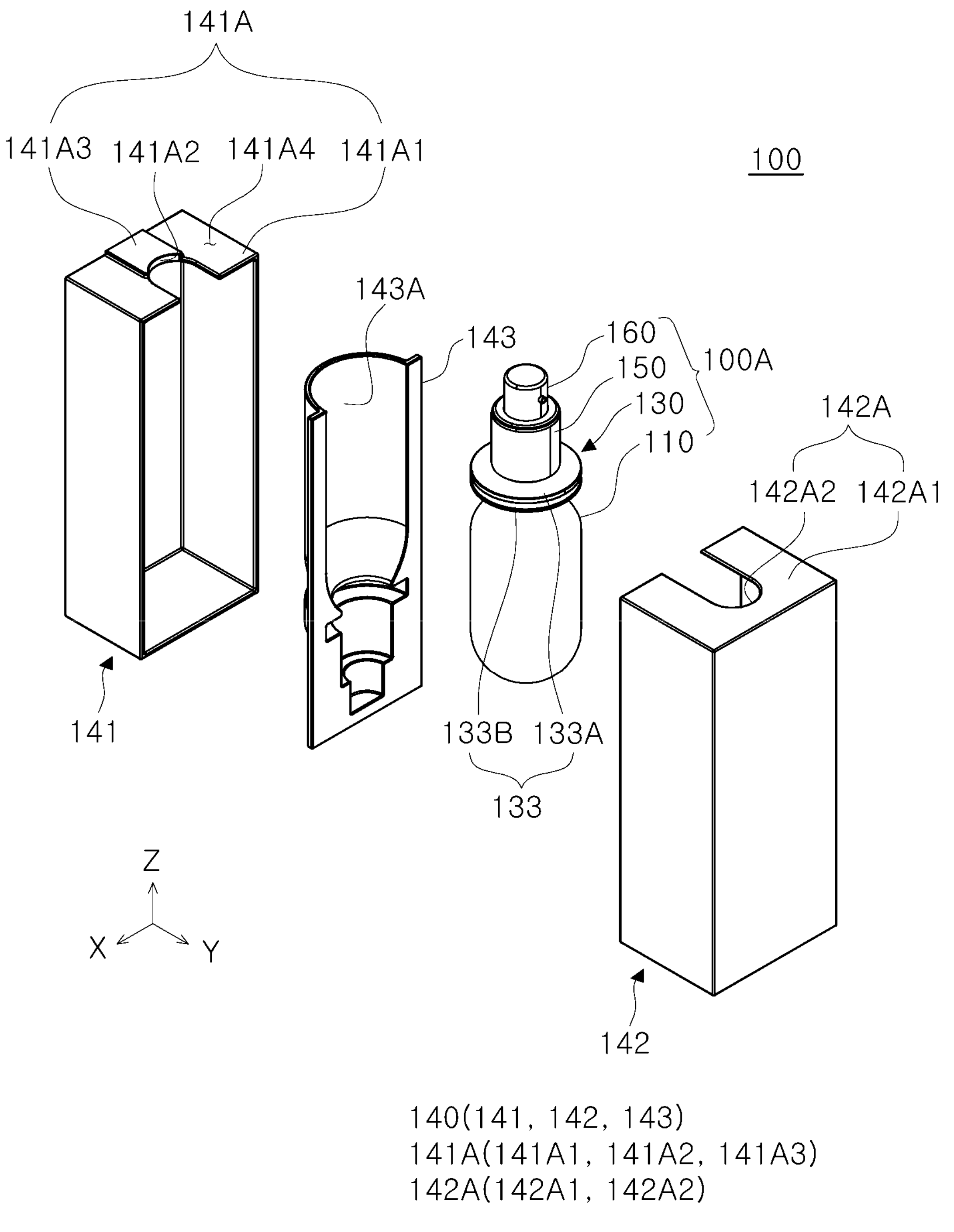
FIG. 10 is an exploded perspective view of FIG. 8.

FIG. 9 is an exploded perspective view of FIG. 7, and FIG. 10 is an exploded perspective view of FIG. 8.

Referring to FIGS. 9 and 10, the casing 140 may include a main body 141, and a cover 142 capable of being coupled to or separated from the main body 141.

The main body 141 may be provided in the form of a box opened at one side thereof and having a predetermined space that communicates with one side opened therein. The main body 141 may accommodate the assembly 100A therein. For example, the main body 141 may include a base having a flat plate shape, and a skirt disposed at an edge of the base and configured to define a predetermined space capable of accommodating the assembly 100A therein.

The main body 141 may be formed in a shape corresponding to an inner surface of the cover 142. In case that the main body 141 is coupled to the cover 142, the main body 141 may be disposed in the cover 142.

The main body 141 may be always kept in close contact with the inner surface of the cover 142 even in case that the main body 141 is connected to the cover 142 or separated from the cover 142. Therefore, the main body 141 and the cover 142 may be kept securely coupled even in case that a large load is applied to the casing 140.

The main body 141 and the cover 142 may stably support the support ring 130 even in a state in which a part of the support ring 130 is disposed outside the casing 140.

For example, the main body 141 may be made of a paper material so that the main body 141 is easily manufactured. However, the present invention is not necessarily limited thereto, and the main body 141 may be made of various materials such as rubber, plastic, glass, and metal.

The cover 142 may be disposed to be opposite to the main body 141 in a direction in which the cover 142 is coupled to or separated from the main body 141, i.e., a Y-axis direction.

The cover 142 may be opened at one side thereof and provided in the form of a box having a predetermined space capable of accommodating the main body 141 therein.

The cover 142 may be coupled to the main body 141 or separated from the main body 141, thereby opening or closing one opened side of the main body 141. For example, the cover 142 may have the same structure as the main body 141.

The cover 142 may be formed in a shape corresponding to an outer surface of the main body 141. The cover 142 may be always kept in close contact with the outer surface of the main body 141 in case that the cover 142 is coupled to the main body 141 or separated from the main body 141.

For example, the cover 142 may be made of various materials such as paper, rubber, plastic, glass, and metal.

Figure 11:
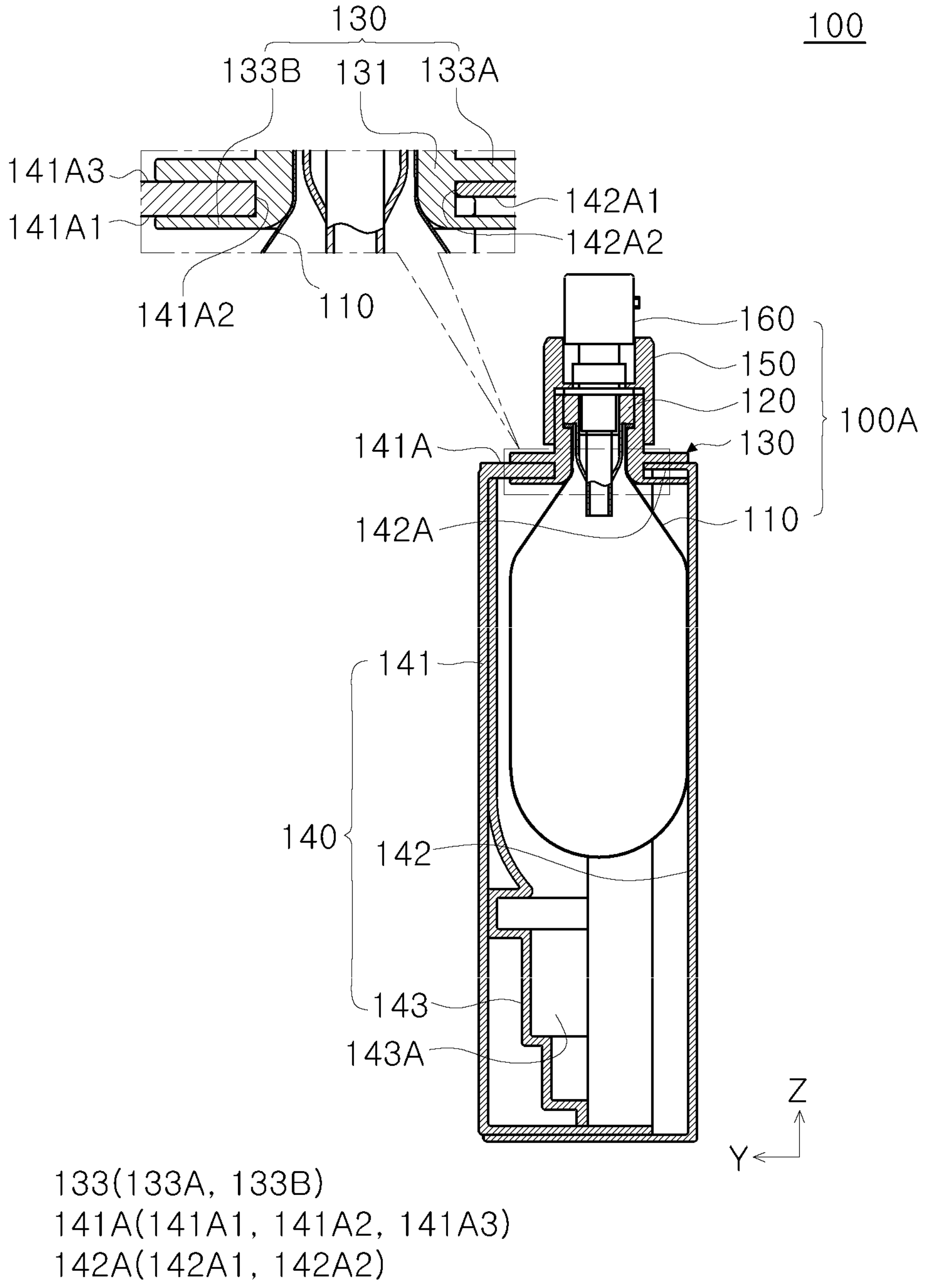
FIG. 11 is a cross-sectional view taken along line XI-XI in FIG. 8.

FIG. 11 is a cross-sectional view taken along line XI-XI in FIG. 8.

Referring to FIGS. 10 and 11, the main body 141 and the cover 142 may respectively include coupling parts 141A and 142A capable of being coupled to the support ring 130.

The coupling parts 141A and 142A may be coupled to the support ring 130 by the process of coupling the main body 141 and the cover 142 and support an outer surface of the support ring 130. The coupling parts 141A and 142A may be separated from the support ring 130 by a process of separating the main body 141 and the cover 142.

In this case, the support ring 130 may further include a coupling plate 133 disposed on the outer surface of the ring body 131 and configured to be coupled to or separated from the casing 140.

The coupling plate 133 may include: a first coupling plate 133A disposed outside the casing 140 and supported on an outer surface of the casing 140 when the first coupling plate 133A is coupled to the casing 140; and a second coupling plate 133B disposed to be spaced apart from the first coupling plate 133A in an axial direction (a Z-axis direction) of the ring body 131, the second coupling plate 133B being disposed in the casing 140 and supported on an inner surface of the casing 140 when the second coupling plate 133B is coupled to the casing 140.

That is, the coupling parts 141A and 142A may be coupled to the support ring 130 when the main body 141 and the cover 142 are coupled. The coupling parts 141A and 142A may support the ring body 131 and the coupling plate 133 provided on the support ring 130.

The coupling parts 141A and 142A may restrict free movements of the support ring 130 in a center-axis direction of the support ring 130, i.e., a Z-axis direction and a radial direction of the support ring 130, i.e., X-axis and Y-axis directions. The coupling parts 141A and 142A may allow a part of the support ring 130 to be disposed outside the casing.

Therefore, the movements in the X-axis direction, the Y-axis direction, and the Z-axis direction of the support ring 130 supported on the coupling parts 141A and 142A are restricted, such that the support ring 130 may be disposed while being kept perfectly fixed to the casing 140.

The coupling parts 141A and 142A may include a first coupling part 141A and a second coupling part 142A.

The first coupling part 141A may be provided on the main body 141 and coupled to one side of the support ring 130 by the process of coupling the main body 141 and the cover 142. The first coupling part 141A may support the support ring 130 at a plurality of positions and restrict the free movements of the support ring 130 in the center axis direction (the Z-axis direction) of the support ring 130 and the radial direction (the X-axis direction and the Y-axis direction) of the support ring 130.

The first coupling part 141A coupled to one side of the support ring 130 may support a part of the ring body 131 and support the first coupling plate 133A and the second coupling plate 133B disposed on the outer surface of the ring body 131 and spaced apart from each other in the center axis direction of the ring body 131.

The second coupling part 142A may be provided on a casing 111B and coupled to the other side of the support ring 130 by the process of coupling the main body 141 and the cover 142. The second coupling part 142A may support the support ring 130 at a plurality of positions and restrict the free movements of the support ring 130 in the center axis direction (the Z-axis direction) of the support ring 130 and the radial direction (the X-axis direction and the Y-axis direction) of the support ring 130.

The second coupling part 142A coupled to the other side of the support ring 130 may support another part of the ring body 131 and support the first coupling plate 133A disposed on the outer surface of the ring body 131 and spaced apart in the center axis direction of the ring body 131.

The first coupling part 141A may include a first main support member 141A1, a first accommodation groove 141A2, and an auxiliary support member 141A3. The first main support member 141A1 may define one surface of the main body 141 having a polyhedral structure and support the second coupling plate 133B of the support ring 130, which is accommodated in the main body 141, in the center axis direction of the support ring 130, i.e., the Z-axis direction when the main body 141 and the cover 142 are coupled.

The first accommodation groove 141A2 may be formed in the first main support member 141A1 and support a part of the ring body 131 in the radial direction of the support ring 130, i.e., the X-axis direction and the Y-axis direction while adjoining the outer surface of the ring body 131 when the main body 141 and the cover 142 are coupled.

The first accommodation groove 141A2 may have a structure opened at one side thereof so that the ring body 131 may enter or exit the first accommodation groove 141A2 in the direction in which the main body 141 and the cover 142 are coupled or separated, i.e., the Y-axis direction.

The first accommodation groove 141A2 may be formed in a shape corresponding to the outer surface of the ring body 131 so that the first accommodation groove 141A2 may surround at least ½ or more of the outer surface of the ring body 131 when the first accommodation groove 141A2 comes into contact with the ring body 131.

The auxiliary support member 141A3 may protrude in the Z-axis direction from an outer surface of the first main support member 141A1 and support a part of the first coupling plate 133A of the support ring 130 in the center axis direction (the Z-axis direction) of the support ring 130 when the main body 141 and the cover 142 are coupled.

The auxiliary support member 141A3 may allow the first coupling plate 133A to be spaced apart from the outer surface of the first main support member 141A1 in the center axis direction (the Z-axis direction) of the support ring 130, such that a coupling groove 141A4, which accommodates the second coupling part 142A, may be formed between the outer surface of the first main support member 141A1 and the first coupling plate 133A.

The auxiliary support member 141A3 may be configured to guide the second coupling part 142A in the direction in which the main body 141 and the cover 142 are coupled or separated, i.e., the Y-axis direction when the main body 141 and the cover 142 are coupled or separated.

The second coupling part 142A may include a second main support member 142A1 and a second accommodation groove 142A2.

The second main support member 142A1 may define one surface of the cover 142 having a polyhedral structure. The second main support member 142A1 may be accommodated in the coupling groove 141A4 by being guided by the auxiliary support member 141A3 in the center axis direction of the support ring 130, i.e., the Z-axis direction when the main body 141 and the cover 142 are coupled.

The second main support member 142A1 accommodated in the coupling groove 141A4 may support another part of the first coupling plate 133A of the support ring 130 disposed outside the main body 141 based on the center axis direction of the support ring 130.

For example, a thickness of the second main support member 142A1, a thickness of the auxiliary support member 141A3, and a height of the coupling groove 141A4 may have the same value.

The second accommodation groove 142A2 may be formed in the second main support member 142A1 and support another part of the ring body 131 in the radial direction of the support ring 130, i.e., the X-axis direction and the Y-axis direction while adjoining the outer surface of the ring body 131 when the main body 141 and the cover 142 are coupled.

The second accommodation groove 142A2 may have a structure opened at one side thereof so that the ring body 131 may enter or exit the second accommodation groove 142A2 in the direction in which the main body 141 and the cover 142 are coupled or separated, i.e., the Y-axis direction.

The second accommodation groove 142A2 may be formed in a shape corresponding to the outer surface of the ring body 131 so that the second accommodation groove 142A2 may surround at least ½ or more of the outer surface of the ring body 131 when the second accommodation groove 142A2 comes into contact with the ring body 131.

Referring to FIGS. 9 and 11, the casing 140 may further include a support mold 143.

The support mold 143 may be disposed in the main body 141. The support mold 143 may have a seating groove 143A corresponding to an external shape of the assembly 100A and support the assembly 100A accommodated in the main body 141.

For example, the seating groove 143A provided in the support mold 143 may include: a first groove portion configured to accommodate the tube 110 of the assembly 100A and support the outer surface of the tube 110; a second groove portion configured to accommodate the support ring 130 of the assembly 100A and support the outer surface of the support ring 130; and a third groove portion configured to accommodate the protection cap 150 and the dispenser 160 of the assembly 100A and support the outer surface of the dispenser 160. However, the support mold 143 is not necessarily limited thereto but may be variously changed in structure and shape and applied.

Therefore, the support mold 143 may prevent the free movement of the assembly 100A in the casing 140 and disperse impact transmitted to the assembly 100A from the outside, thereby preventing damage to the assembly 100A.

Figure 12:
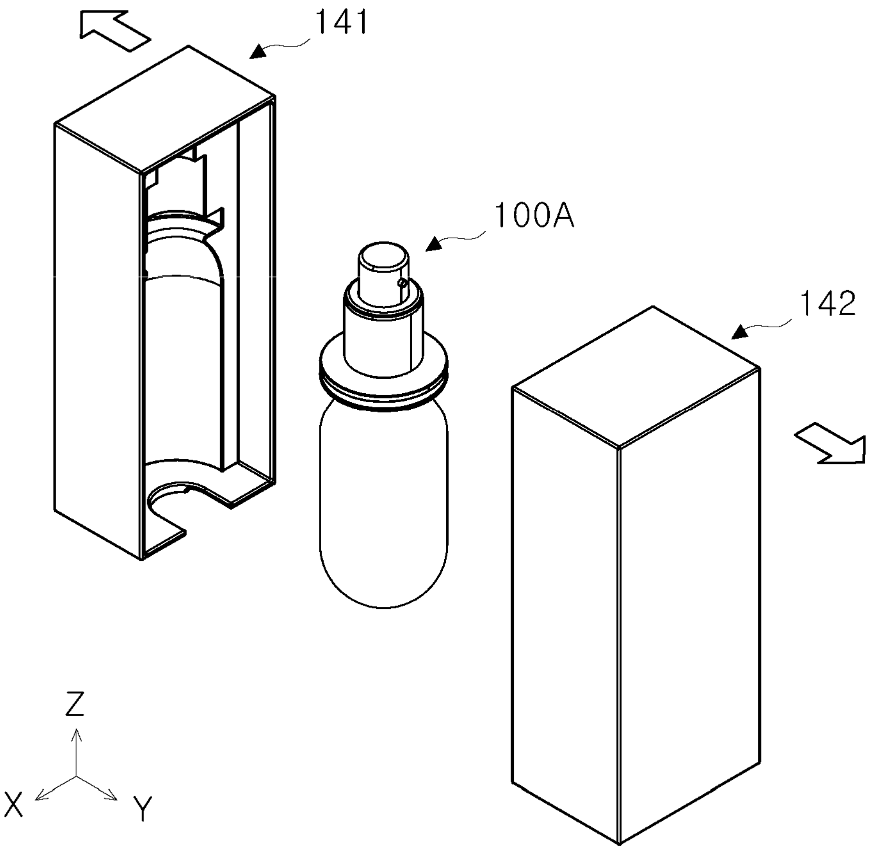
FIGS. 12 to 14 are views illustrating a process of coupling the casing of the storage container to the assembly according to the embodiment of the present invention.
Figure 13:
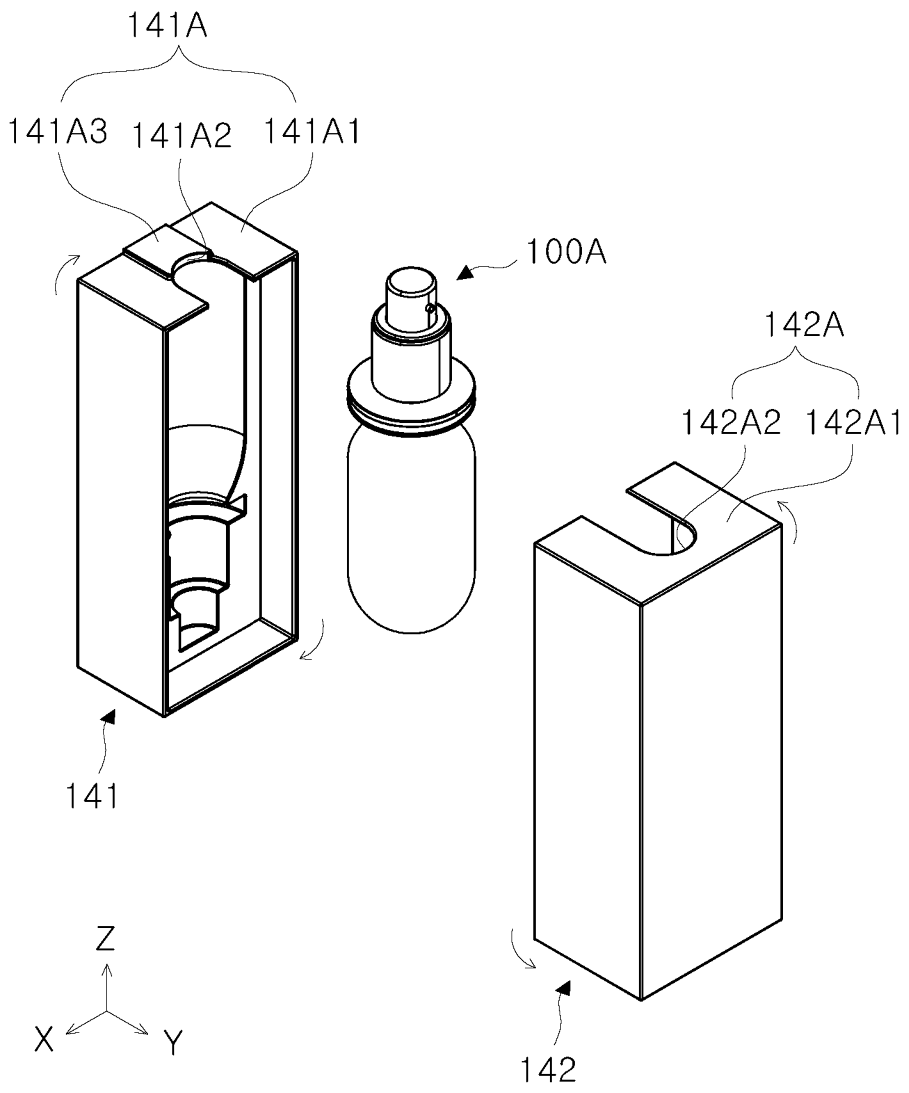
Figure 14:
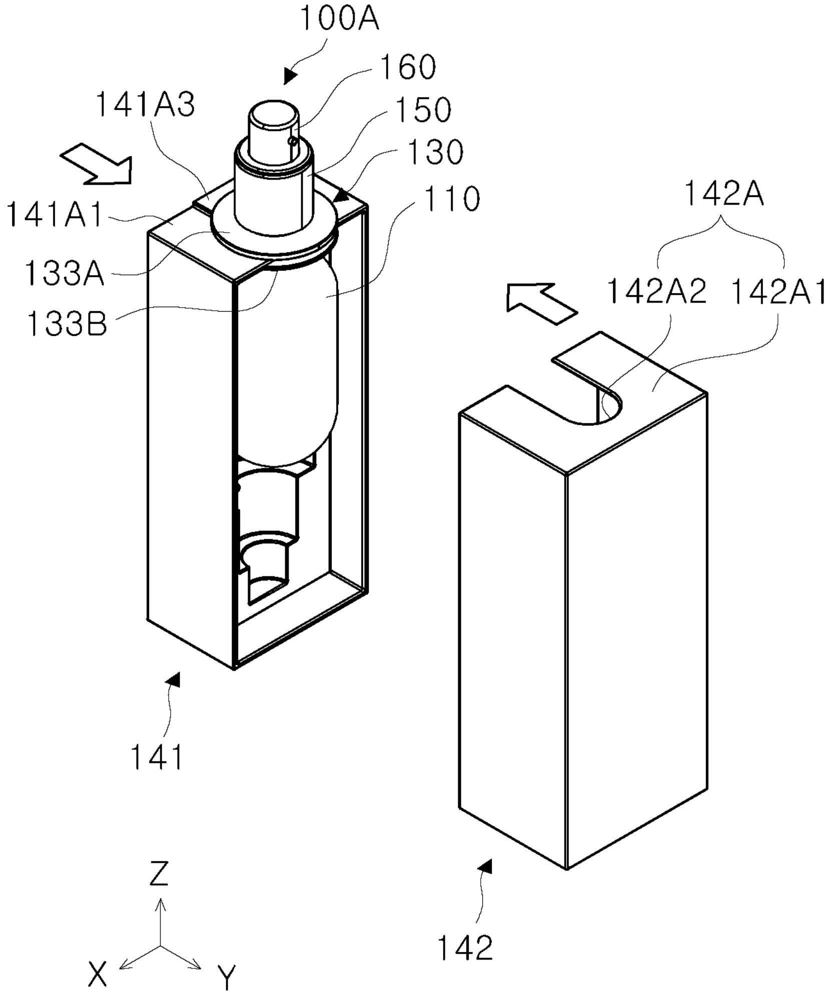

FIGS. 12 to 14 are views illustrating a process of coupling the casing of the storage container to the assembly according to the embodiment of the present invention.

A process of mounting the assembly 100A on the casing 140 will be described with reference to FIGS. 12 to 14.

Referring to FIG. 12, the cover 142 is separated from the main body 141, and then the assembly 100A is separated from the main body 141.

Next, referring to FIG. 13, the main body 141 and the cover 142 are rotated to be turned upside down so that the coupling parts 141A and 142A respectively provided on the main body 141 and the cover 142 are directed toward the assembly 100A.

Next, referring to FIGS. 13 and 14, the first coupling part 141A provided on the main body 141 is coupled to one side of the support ring 130, and then the main body 141 and the cover 142 are coupled, such that the second coupling part 142A provided on the cover 142 is coupled to the other side of the support ring 130.

Therefore, in the state in which the support ring 130 is completely fixed to the casing 140, the tube 110 is accommodated in the casing 140, and the protection cap 150 and the dispenser 160 are disposed outside the casing 140.

Figure 15:
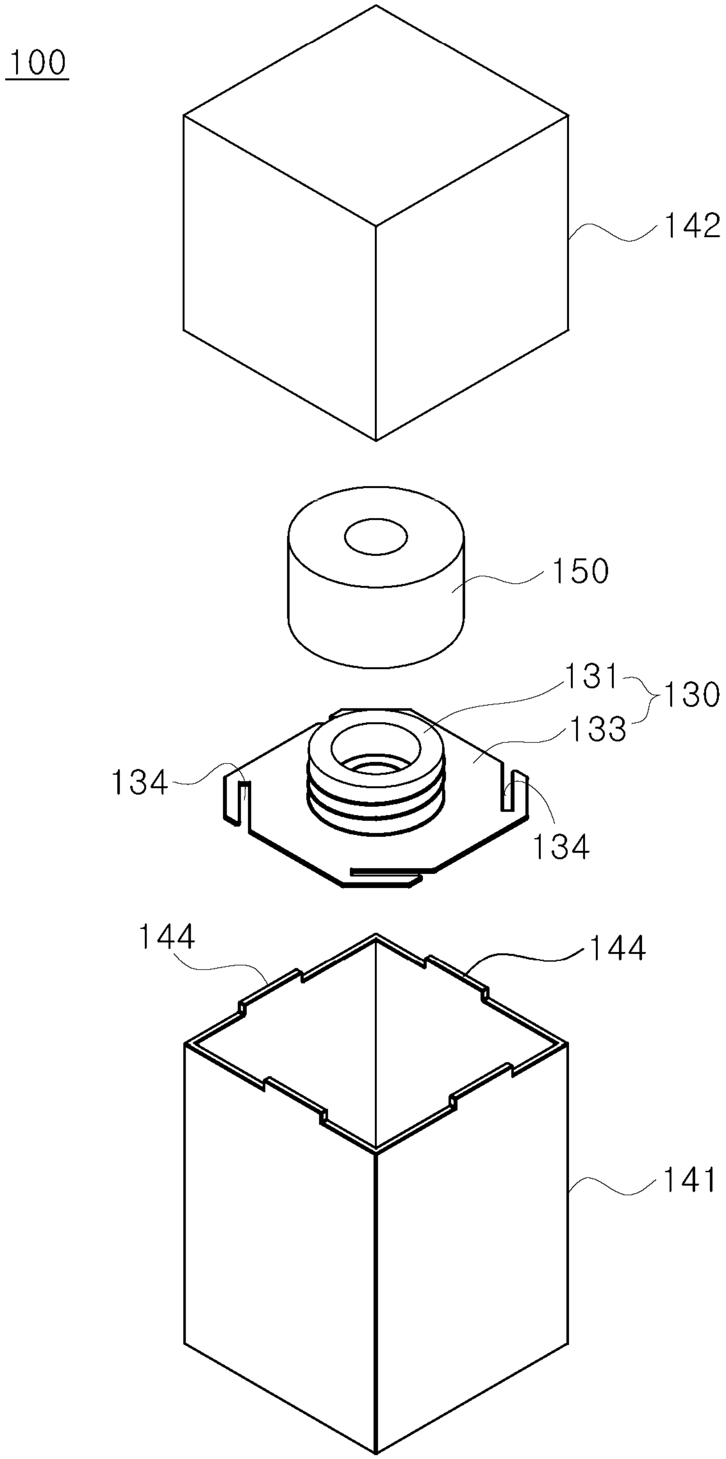
FIG. 15 is an exploded perspective view illustrating a storage container according to another embodiment of the present invention.
Figure 16:
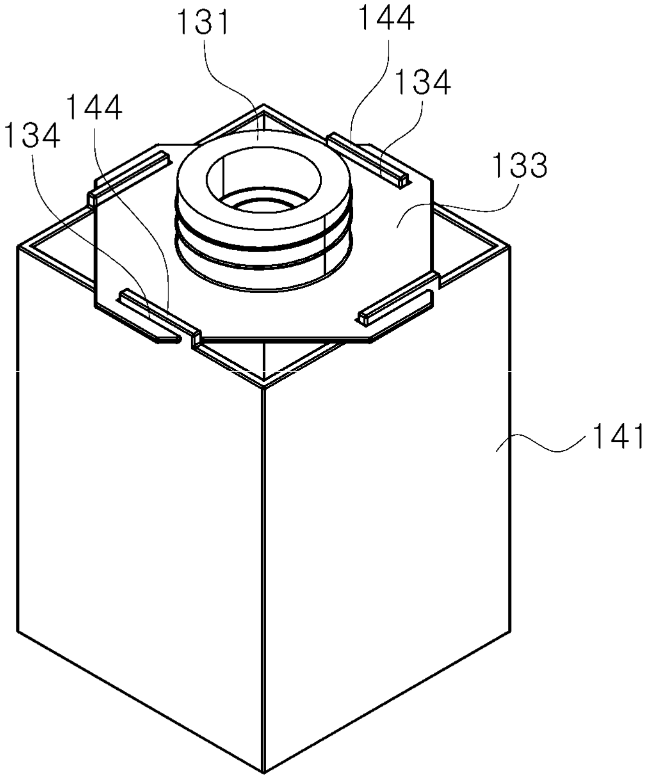
FIG. 16 is a perspective view illustrating a state in which a support ring of the storage container according to another embodiment of the present invention is coupled to a casing.
Figure 17:
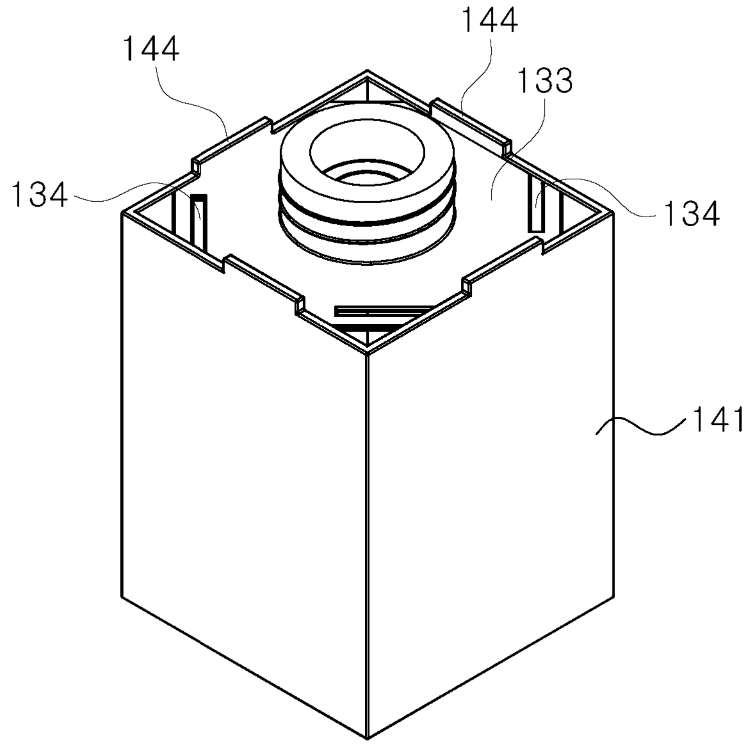
FIG. 17 is a perspective view illustrating a state in which the support ring of the storage container according to another embodiment of the present invention is separated from the casing.

FIG. 15 is an exploded perspective view illustrating a storage container according to another embodiment of the present invention, FIG. 16 is a perspective view illustrating a state in which a support ring of the storage container according to another embodiment of the present invention is coupled to a casing, and FIG. 17 is a perspective view illustrating a state in which the support ring of the storage container according to another embodiment of the present invention is separated from the casing.

Referring to FIG. 15, the casing 140 may be configured to be coupled or separated in the center axis direction of the ring body 131.

The casing 140 may include: the main body 141 opened at an upper side the other so that the tube 110 may enter or exit the main body 141 in the center axis direction of the ring body 131; and the cover 142 configured to be coupled to or separated from an upper portion of the main body 141.

The main body 141 and the cover 142 may each have a polyhedral structure.

The coupling plate 133 provided on the support ring 130 may be configured to be coupled to or separated from an upper end of the main body 141 in the center axis direction of the ring body 131.

That is, because the coupling plate 133 is provided in the form of a cap coupled to the upper end of the main body 141 and configured to open or close the opened upper side of the main body 141, the coupling plate 133 may be easily coupled to or separated from the main body 141, and productivity may be improved by the simple structure.

The main body 141 may include at least one coupling member 144 formed at the upper end thereof. The coupling plate 133 may include at least one long groove 134 capable of being coupled to at least one coupling member 144.

The coupling plate 133 may be formed in a shape corresponding to an inner surface of the main body 141.

The at least one long groove 134 may be formed at an edge of the coupling plate 133.

Therefore, as illustrated in FIG. 16, when the long groove 134 is coupled to the coupling member 144, the coupling plate 133 may be caught and supported by the upper end of the main body 141 in a state in which the coupling plate 133 is rotated at a predetermined angle in a circumferential direction.

On the contrary, as illustrated in FIG. 17, when the long groove 134 is separated from the coupling member 144, the coupling plate 133 may be accommodated in the main body 141 in a state in which respective sides of the coupling plate 133 are aligned to correspond to the inner surface of the main body 141. Because the coupling plate 133 accommodated in the main body 141 has a shape corresponding to the inner surface of the main body 141, the coupling plate 133 may be supported on the inner surface of the main body 141.

Figure 18:
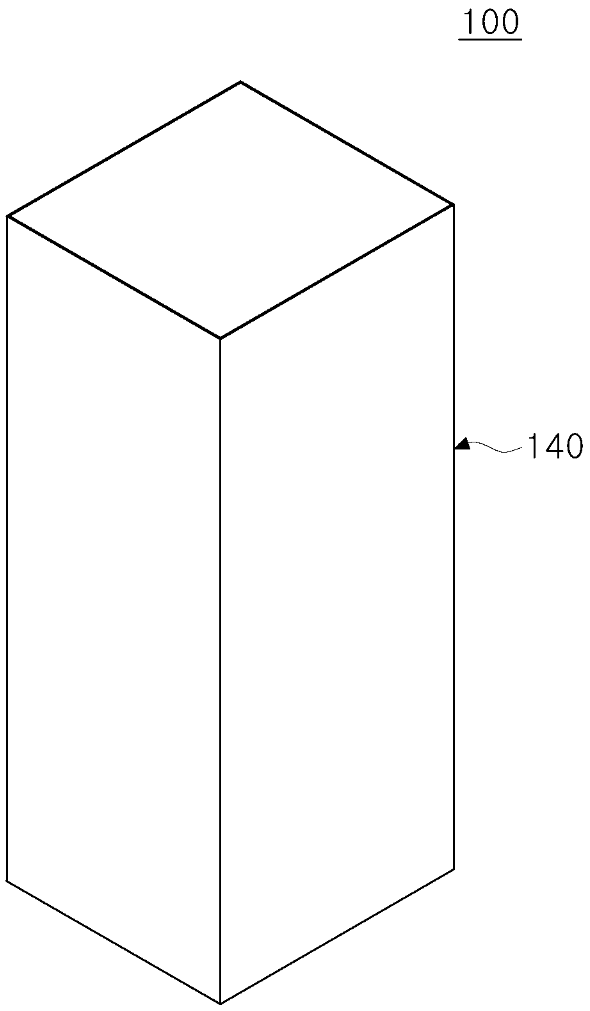
FIG. 18 is a perspective view illustrating a state in which an assembly is accommodated in a casing of a storage container according to still another embodiment of the present invention.
Figure 19:
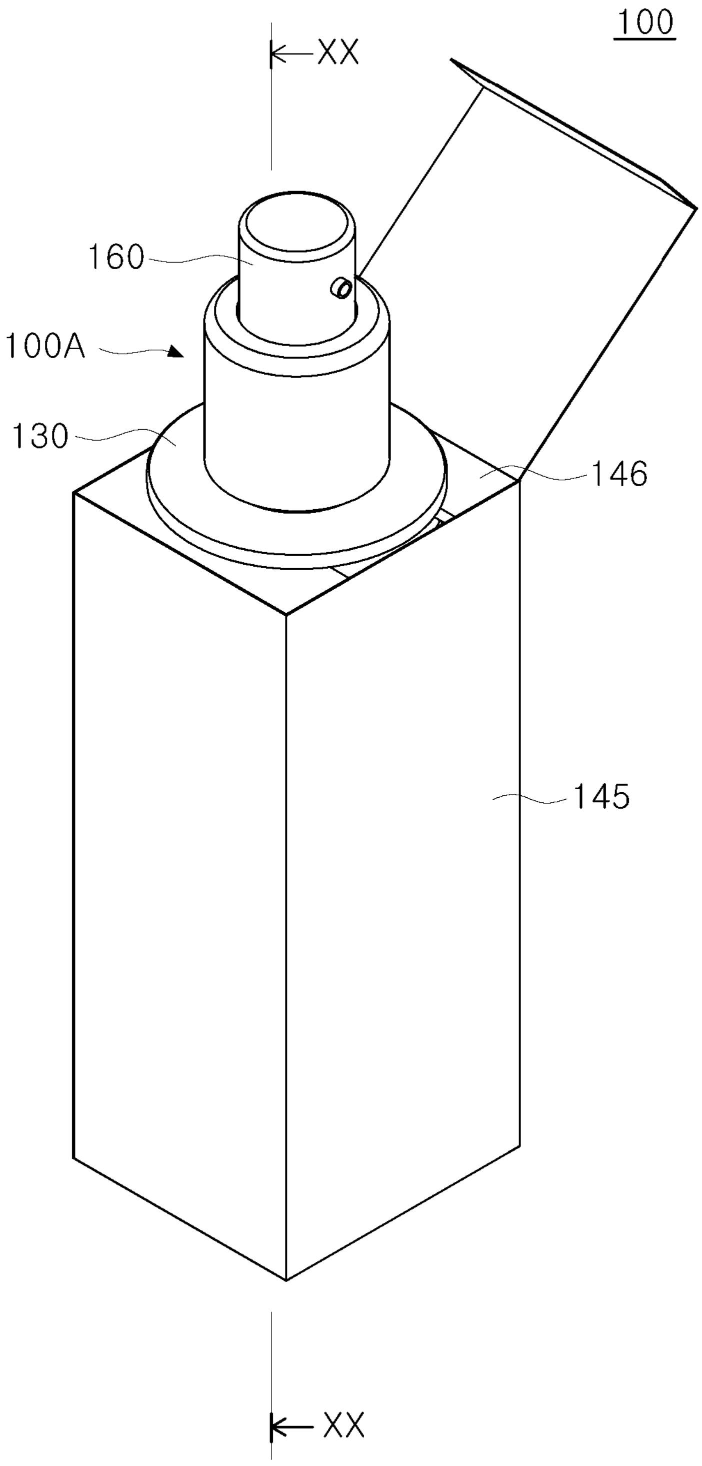
FIG. 19 is a perspective view illustrating a state in which a support ring is coupled to the casing of the storage container according to still another embodiment of the present invention.
Figure 20:
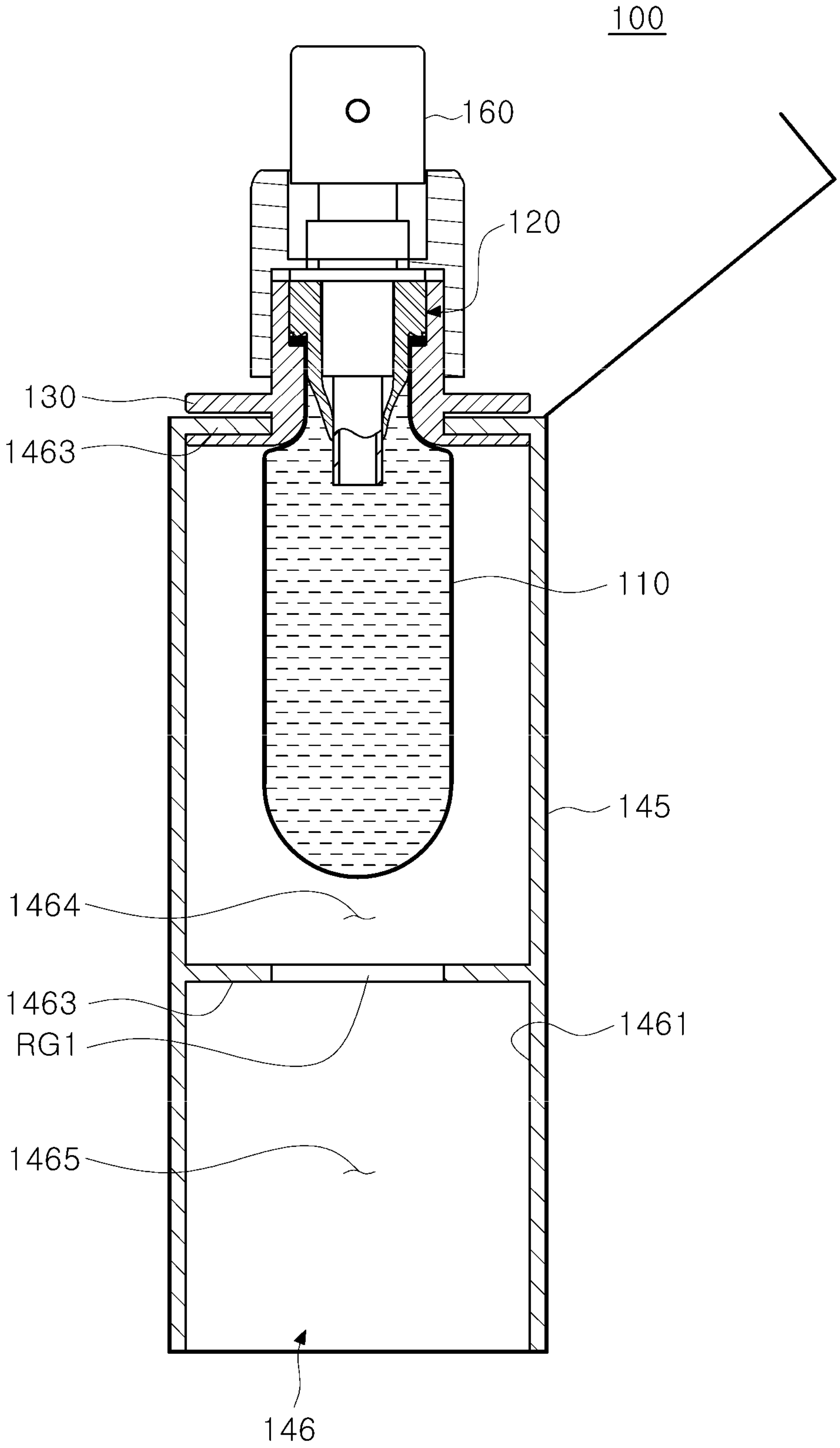
FIG. 20 is a cross-sectional view taken along line XX-XX in FIG. 18.

FIG. 18 is a perspective view illustrating a state in which an assembly is accommodated in a casing of a storage container according to still another embodiment of the present invention, FIG. 19 is a perspective view illustrating a state in which a support ring is coupled to the casing of the storage container according to still another embodiment of the present invention, and FIG. 20 is a cross-sectional view taken along line XX-XX in FIG. 18.

Referring to FIGS. 18 to 20, the casing 140 may include an accommodation body 145 and a support 146.

The accommodation body 145 may have a predetermined space capable of accommodating the assembly 100A therein, and an upper side of the accommodation body 145 may be configured to be opened or closed. Therefore, the accommodation body 145 may safely protect the assembly 100A, which is accommodated therein, from the outside.

The accommodation body 145 may have a hexahedral structure so that the accommodation body 145 may be disposed in a state of standing on the ground surface. Further, a cover member may be provided at the upper end of the accommodation body 145 and rotatably coupled to the accommodation body 145 so as to open or close the opened upper side of the accommodation body 145. However, the shape of the accommodation body 145 is not necessarily limited thereto but may be changed to various shapes.

Figure 21:
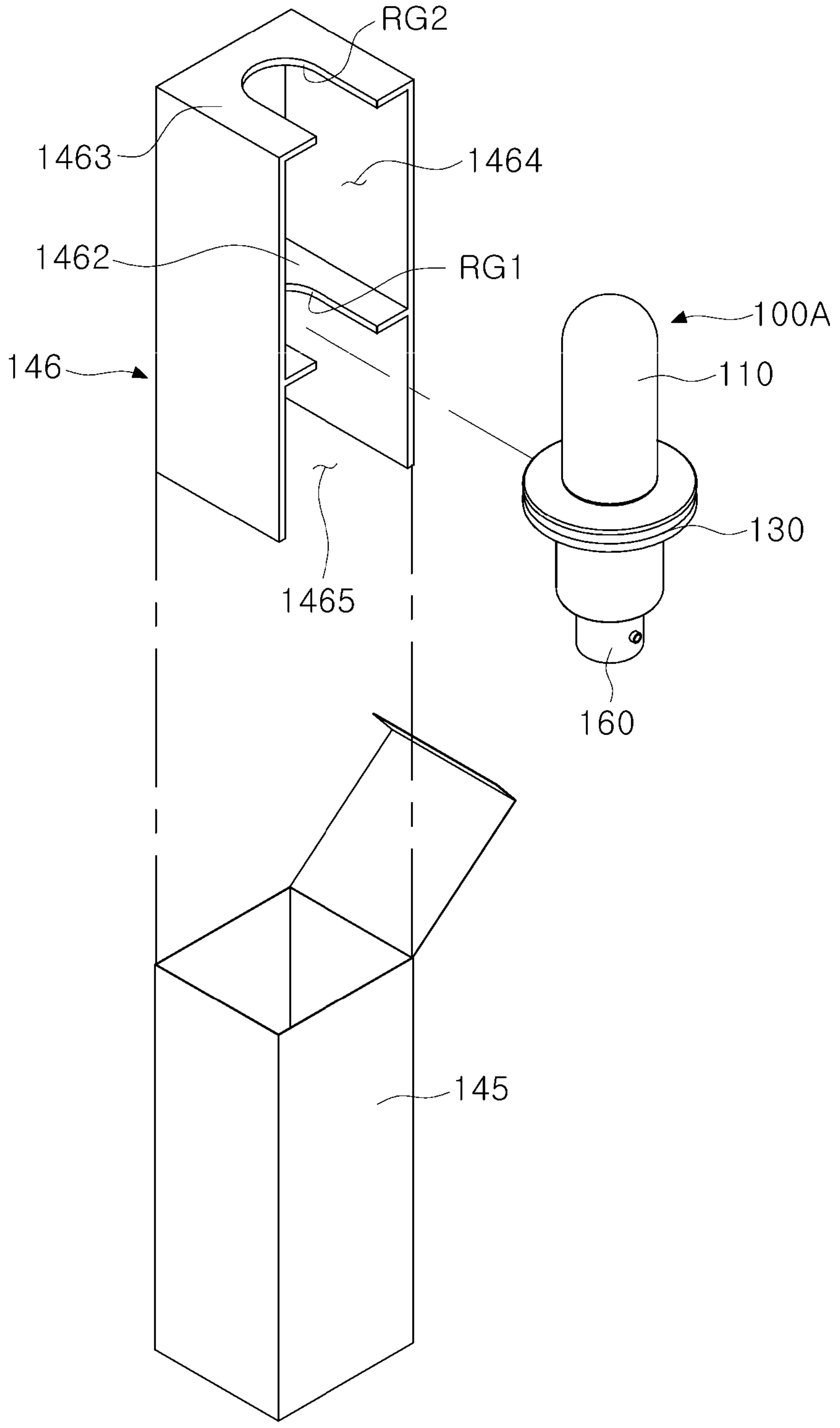
FIG. 21 is an exploded perspective view of FIG. 18.
Figure 22:
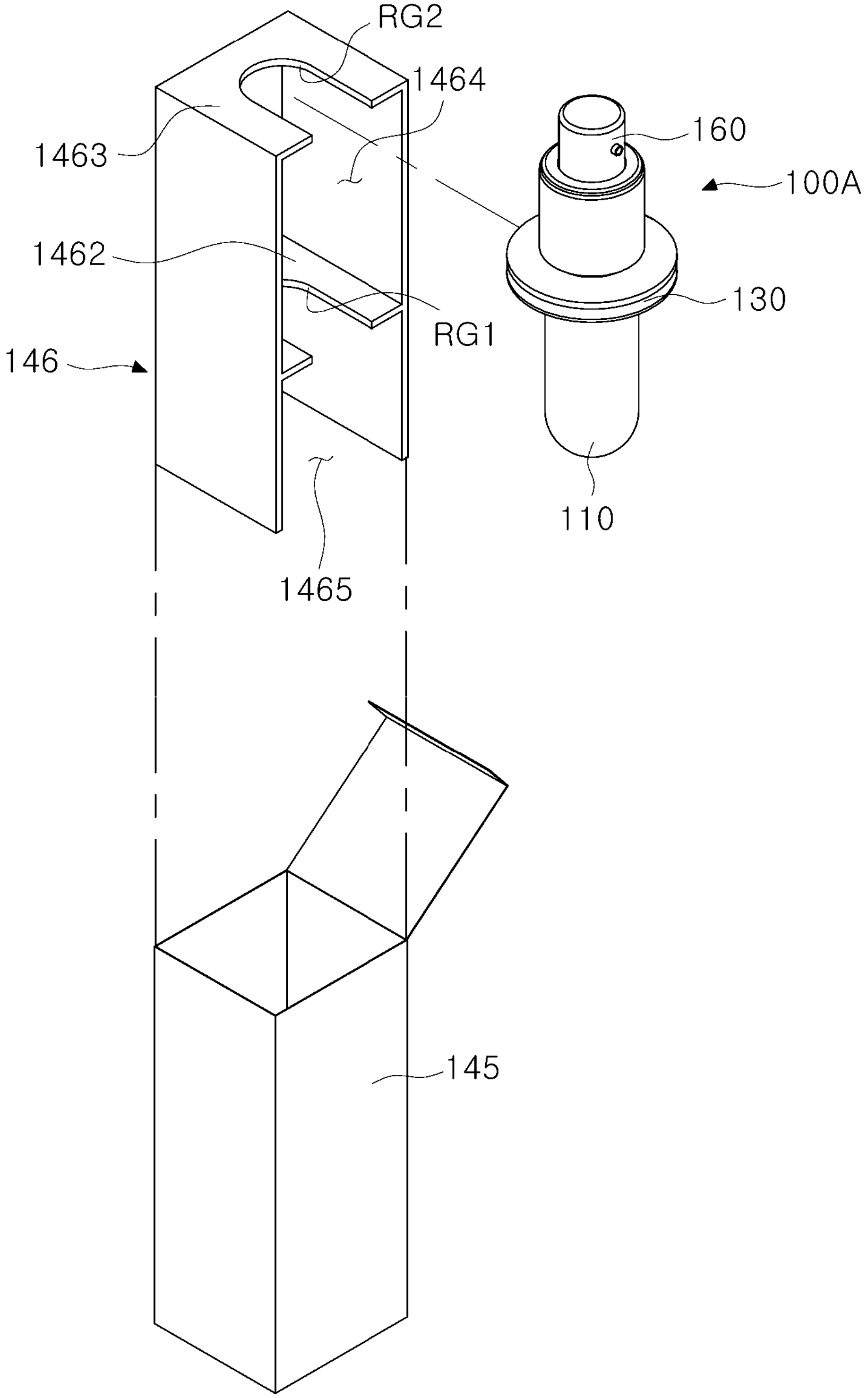
FIG. 22 is an exploded perspective view of FIG. 19.

FIG. 21 is an exploded perspective view of FIG. 18, and FIG. 22 is an exploded perspective view of FIG. 19.

Referring to FIGS. 18 to 22, the support 146 may be configured to enter or exit the accommodation body 145 through the opened upper side of the accommodation body 145 and coupled to the assembly 100A to support the assembly 100A.

Therefore, the support 146 may prevent the free movement of the assembly 100A and prevent deformation of and damage to the assembly 100A by dispersing impact transmitted to the assembly 100A.

The support 146 may include a base member 1461 and a plurality of coupling support members 1462 and 1463.

The base member 1461 may have a length corresponding to the accommodation body 145. Further, the base member 1461 may have a shape corresponding to an inner surface of the accommodation body 145. Therefore, the base member 1461 accommodated in the accommodation body 145 may be supported on the inner surface of the accommodation body 145. In addition, a space capable of accommodating the assembly 100A may be formed in the base member 1461. For example, the base member 1461 may have a structure having a '⊏'-shaped cross-section.

The plurality of coupling support members 1462 and 1463 may be disposed on the base member 1461 and coupled to the assembly 100A at different positions, such that the entire assembly 100A may be disposed in the base member 1461. Alternatively, at least a part of the assembly 100A may be disposed inside the base member 1461, and the other part of the assembly 100A may be disposed outside the base member 1461.

That is, the plurality of coupling support members 1462 and 1463 is coupled to the assembly 100A and supports the outer surface of the assembly 100A, thereby restricting the free movement of the assembly 100A in a particular direction.

The plurality of coupling support members 1462 and 1463 may include a first coupling support member 1462 and a second coupling support member 1463.

The first coupling support member 1462 may be disposed in the base member 1461 and divide an internal space of the base member 1461.

Therefore, a plurality of accommodation spaces 1464 and 1465 may be provided in the support 146.

Specifically, the support 146 may have therein a first accommodation space 1464 defined between the first coupling support member 1462 and the second coupling support member 1463, and a second accommodation space 1465 defined below the first coupling support member 1462.

Further, the first coupling support member 1462 may be configured to be coupled to the support ring 130 so that the assembly 100A is disposed in the base member 1461.

The second coupling support member 1463 may be disposed at an upper end of the base member 1461 and coupled to the support ring 130, such that the tube 110 is disposed inside the base member 1461, and the dispenser 160 is disposed outside the base member 1461.

In this case, the first coupling support member 1462 and the second coupling support member 1463 may respectively include ring accommodation grooves RG1 and RG2 configured to accommodate the support ring 130 and each having a shape corresponding to the outer surface of the support ring 130.

Therefore, when the support ring 130 of the assembly 100A is coupled to the first coupling support member 1462, the tube 110 may be disposed inside the first accommodation space 1464, and the dispenser 160 may be disposed outside the support 146. Further, when the support ring 130 of the assembly 100A is coupled to the second coupling support member 1463, the tube 110 may be disposed in the first accommodation space 1464, and the dispenser 160 may be disposed in the second accommodation space 1465.

That is, the support 146 provides different coupling structures coupled to the assembly 100A, such that it is possible to maintain a use state in which the dispenser 160 is exposed to the outside or a storage state in which the dispenser 160 is accommodated in the support 146.

For example, the accommodation body 145 and the support 146 may be made of paper so that the accommodation body 145 and the support 146 may be easily manufactured and reused. However, the material of the accommodation body 145 and the support 146 is not necessarily limited thereto but may be changed to various materials, as necessary.

Hereinafter, a method of injecting a liquid into the storage container 100 according to the embodiment of the present invention will be described.

For reference, for convenience of description, the components for explaining the method of injecting a liquid into the storage container 100 according to the embodiment of the present invention are denoted by the reference numerals used to explain the storage container 100 according to the embodiment of the present invention, and an identical or repeated description thereof will be omitted.

Figure 23:
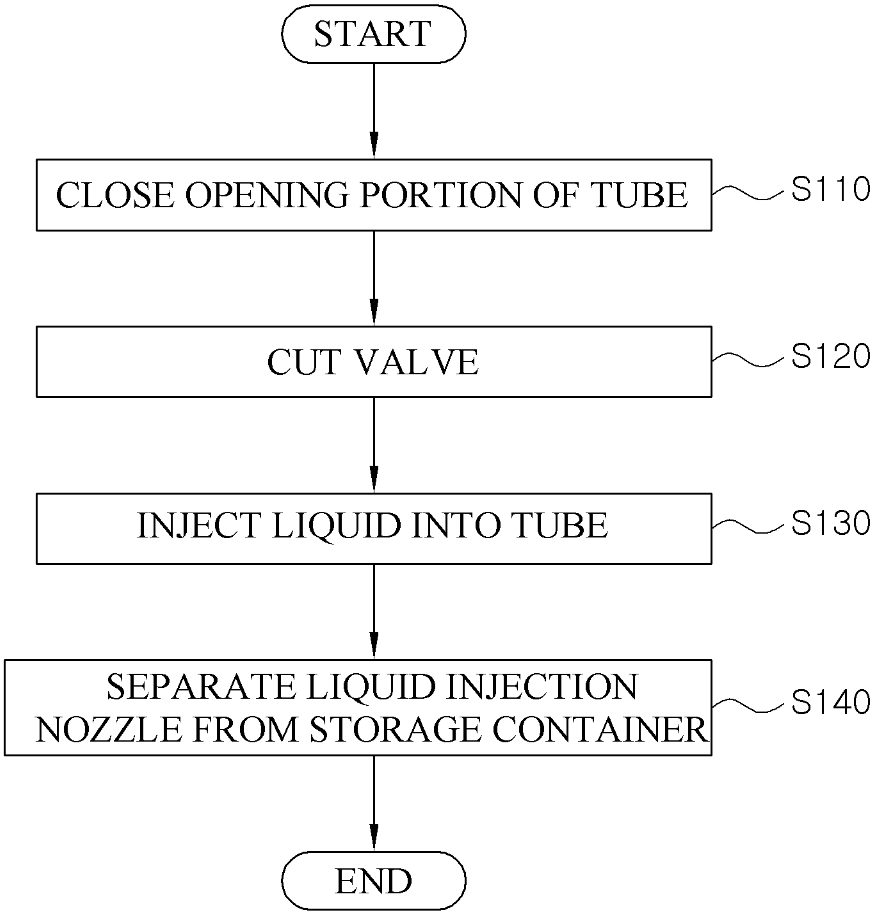
FIGS. 23 to 25 are flowcharts illustrating a method of injecting a liquid into the storage container according to the embodiment of the present invention.
Figure 24:
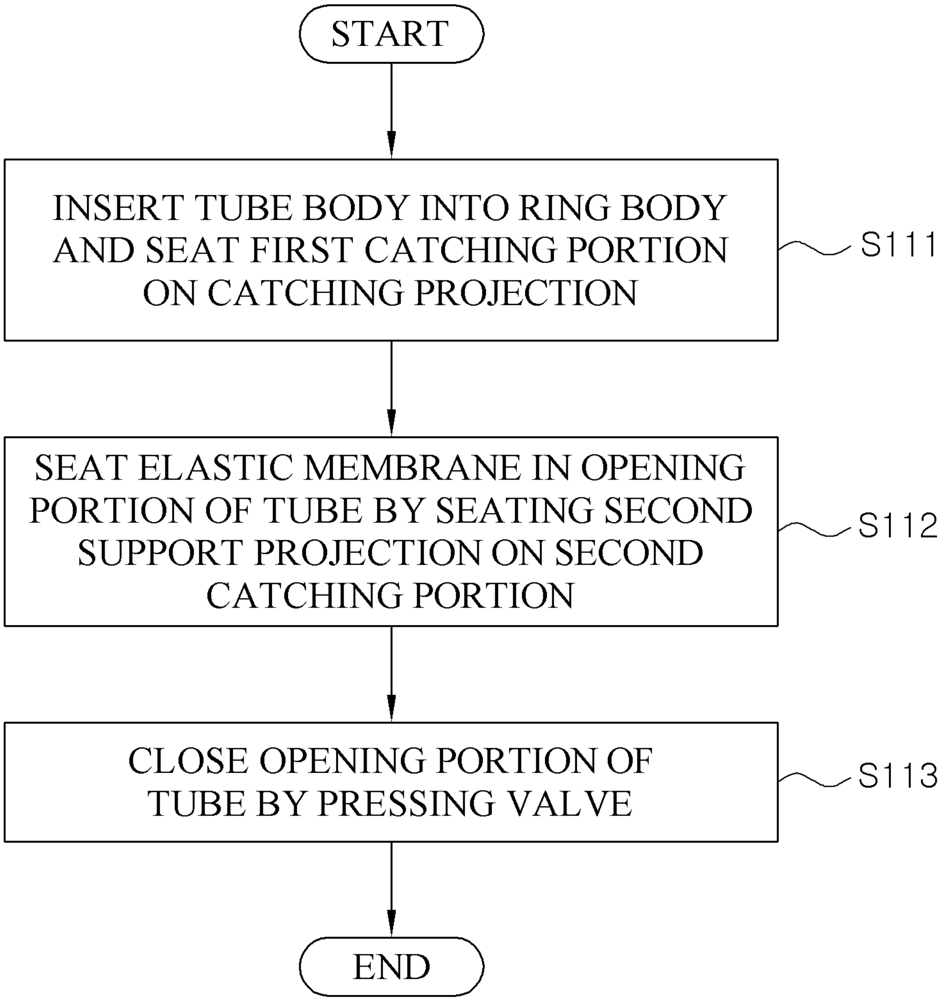
Figure 25:
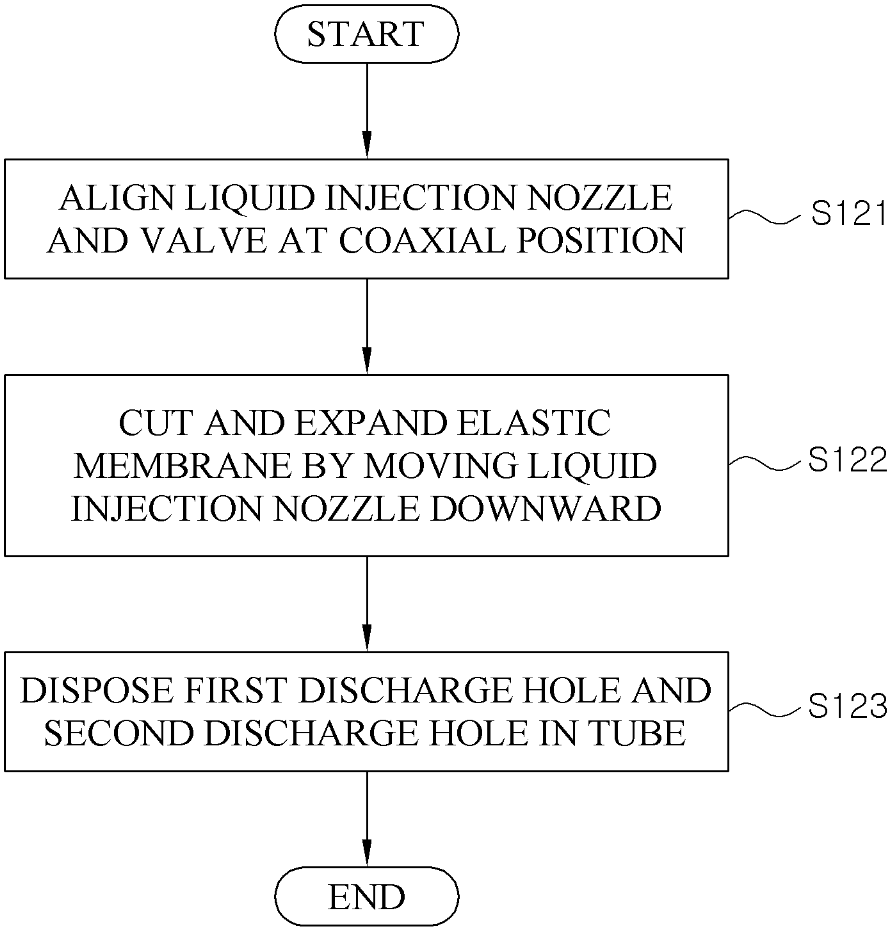

FIGS. 23 to 25 are flowcharts illustrating the method of injecting a liquid into the storage container according to the embodiment of the present invention.

Referring to FIGS. 1 and 23, a liquid injection device (not illustrated) closes the opening portion O of the tube 110 by coupling the valve 120 to the tube 110 coupled to the support ring 130 (S110).

Specifically, referring to FIGS. 2 and 24, the liquid injection device inserts the tube body 111 into the ring body 131 and seats the first catching portion 112 on the catching projection 132 (5111).

When the first catching portion 112 is seated on the catching projection 132, the liquid injection device seats the second support projection 123 on the second catching portion 113, such that the elastic membrane 121 is disposed in the opening portion O of the tube 110 (S112).

When the elastic membrane 121 is disposed in the opening portion O of the tube 110, the liquid injection device presses the valve 120 in the vertical direction to bring the first support projection 122 into close contact with the first catching portion 112 and compress the elastic membrane 121 against the inner surface of the tube body 111, thereby closing the opening portion O of the tube 110 (S113).

Referring to FIGS. 3 and 23, when the opening portion O of the tube 110 is closed, the liquid injection device cuts the valve 120 by inserting the liquid injection nozzle 200 into the storage container 100 (S120).

Specifically, referring to FIG. 25, when the opening portion O of the tube 110 is closed, the liquid injection device aligns the liquid injection nozzle 200, which is disposed above the valve 120, and the valve 120 at a coaxial position (S121).

Referring to FIGS. 3 and 25, when the liquid injection nozzle 200 and the valve 120 are aligned at the coaxial position, the liquid injection device cuts the elastic membrane 121 and gradually expands the cut portion while moving the liquid injection nozzle 200 downward (S122).

Referring to FIGS. 5, 6, and 25, when the cut portion is expanded, the liquid injection device disposes the first discharge hole 212 and the second discharge hole 213 in the tube 110 by further moving the liquid injection nozzle 200 downward (S123).

Referring to FIG. 23, when the liquid injection nozzle 200 is inserted into the storage container 100, the liquid injection device expands the tube 110 by injecting a predetermined amount of liquid into the tube 110 (S130).

When the tube 110 is filled with the predetermined amount of liquid, the liquid injection device stops the injection of the liquid and separates the liquid injection nozzle 200 from the storage container 100 by moving the liquid injection nozzle 200 upward (S140).

According to the embodiment of the present invention as described above, the valve 120 coupled to the opening portion O of the tube 110 is not cut in advance, but the valve 120 is cut when the liquid injection nozzle 200 is inserted into the tube 110, such that the valve 120 may be perfectly in close contact with the outer surface of the liquid injection nozzle 200, and thus a gap between the liquid injection nozzle 200 and the valve 110 is perfectly blocked, which makes it possible to prevent a leak of the liquid.

In addition, a valve cutting process of forming in advance a cut-out groove in the valve 120 may be excluded, such that the entire process may be simplified, and the productivity and costs of the product may be reduced.

While the exemplary embodiments of the present invention have been illustrated and described above, the present invention is not limited to the specific exemplary embodiments, and various modifications can of course be made by those skilled in the art to which the present invention pertains without departing from the subject matter of the present invention as claimed in the claims. Further, the modifications should not be appreciated individually from the technical spirit or prospect of the present invention.

What is claimed is:

1. A storage container comprising:

a tube made of an expandable or contractible elastic material;

a valve configured to be coupled to an upper end of the tube before a liquid is injected into the tube;

a support ring configured to accommodate the tube and the valve, the support ring comprising a ring body configured to accommodate and protect the tube, and a coupling plate disposed on an outer surface of the ring body; and a casing configured to be separably coupled to the coupling plate of the support ring and to accommodate and protect at least part of an assembly comprised of the tube, the valve, and the support ring, wherein the valve comprises:

a ring-shaped support portion configured to be seated and supported at the upper end of the tube; and an elastic membrane extending from an end of the ring-shaped support portion and configured to close an opening portion of the tube, and wherein the coupling plate of the support ring comprises:

a first coupling plate disposed outside the casing and supported on an outer surface of the casing when the coupling plate is coupled to the casing; and a second coupling plate that is spaced apart from the first coupling plate in an axial direction of the ring body, the second coupling plate being disposed inside the casing and supported on an inner surface of the casing when the coupling plate is coupled to the casing.

2. The storage container of claim 1, wherein the support ring further comprises a catching projection configured to support the upper end of the tube accommodated in the ring body.

3. The storage container of claim 2, wherein the tube comprises:

a tube body accommodated in the ring body and configured to accommodate the liquid therein;

a first catching portion extending from an end of the tube body in a radial direction of the tube body and seated and supported on the catching projection; and a second catching portion extending upward from an end of the first catching portion and supported on the ring body.

4. The storage container of claim 3, wherein the ring-shaped support portion comprises:

a first support projection supported on the first catching portion and the second catching portion; and a second support projection supported on the second catching portion and the ring body.

5. The storage container of claim 4, wherein the valve further comprises a gap blocking member disposed on a bottom surface of the first support projection corresponding to the first catching portion, and wherein the gap blocking member is configured to block a gap between the first catching portion and the first support projection by being compressed between the first catching portion and the first support projection when pressure is applied to the valve in a vertical direction.

6. The storage container of claim 1, wherein the elastic membrane has a structure protruding from the end of the ring-shaped support portion in an axial direction of the valve to a lower side of the valve.

7. The storage container of claim 6, wherein the elastic membrane has a structure in which an inner diameter gradually decreases in a direction in which the elastic membrane protrudes.

8. The storage container of claim 7, wherein the elastic membrane is formed in a hemispherical shape.

9. The storage container of claim 7, wherein the elastic membrane has a structure in which a thickness gradually increases in the direction in which the elastic membrane protrudes.

10. The storage container of claim 1, further comprising:

a liquid injection nozzle configured to be inserted into the tube while cutting the elastic membrane and inject the liquid into the tube.

11. The storage container of claim 10, wherein the liquid injection nozzle comprises:

a discharge part having a tubular shape and configured to discharge the liquid, which flows in the discharge part, in different directions; and a blade part extending from the discharge part and having a wedge structure in which a width of a cross-section gradually decreases toward an end thereof, the blade part being configured to press and cut the elastic membrane while being moved by the discharge part.

12. The storage container of claim 11, wherein the blade part comprises:

a pair of first bevel surfaces disposed to be opposite to each other in a first direction and each having a concave curved shape; and a second bevel surface disposed to be inclined in a second direction that intersects the first direction.

13. The storage container of claim 12, wherein the pair of first bevel surfaces has different radii of curvature.

14. The storage container of claim 12, wherein the discharge part comprises:

a discharge body having a tubular shape so that the liquid flows in the discharge body;

a first discharge hole configured to discharge the liquid, which flows in the discharge body, in the first direction; and a second discharge hole configured to discharge the liquid, which flows in the discharge body, in the second direction.

15. The storage container of claim 1, wherein the casing is further configured to be coupled to the assembly to accommodate the at least part of the assembly and expose another part of the assembly to the outside.

16. The storage container of claim 15, wherein when the casing and the support ring are coupled, the tube is disposed inside the casing, and a part of the support ring is disposed outside the casing.

17. The storage container of claim 1, wherein the casing comprises:

a main body opened at one side thereof and configured to accommodate the assembly; and a cover configured to open or close one opened side of the main body by being coupled to the main body or separated from the main body, and wherein the main body and the cover comprise coupling parts configured to be coupled to the support ring by a process of coupling the main body and the cover or separated from the support ring by a process of separating the main body and the cover.

18. A method of injecting a liquid into the storage container according to claim 10, the method comprising:

closing the opening portion of the tube by coupling the valve to the tube;

cutting the valve by inserting the liquid injection nozzle into the storage container;

expanding the tube by injecting the liquid into the tube; and separating the liquid injection nozzle from the storage container.

* * * * *